United States Patent
Ko et al.

(10) Patent No.: US 10,608,801 B2
(45) Date of Patent: Mar. 31, 2020

(54) METHOD FOR TRANSMITTING REFERENCE SIGNAL AND DEVICE THEREFOR IN WIRELESS COMMUNICATION SYSTEM

(71) Applicant: LG ELECTRONICS INC., Seoul (KR)

(72) Inventors: Hyunsoo Ko, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/375,645

(22) Filed: Apr. 4, 2019

(65) Prior Publication Data
US 2019/0238294 A1 Aug. 1, 2019

Related U.S. Application Data

(63) Continuation of application No. 16/065,108, filed as application No. PCT/KR2018/000152 on Jan. 4, 2018.
(Continued)

(51) Int. Cl.
*H04W 4/00* (2018.01)
*H04L 5/00* (2006.01)
(Continued)

(52) U.S. Cl.
CPC ......... *H04L 5/0051* (2013.01); *H04B 7/0417* (2013.01); *H04L 1/0026* (2013.01);
(Continued)

(58) Field of Classification Search
CPC ....... H04B 7/04; H04B 7/0417; H04L 1/0001; H04L 1/0026; H04L 5/0048; H04L 5/005;
(Continued)

(56) References Cited

U.S. PATENT DOCUMENTS 8,699,618 B2    4/2014  Park et al.
9,425,946 B2 *  8/2016  Pourahmadi .......... H04L 5/0073
                        (Continued)

FOREIGN PATENT DOCUMENTS

EP          3566512       11/2019
KR       1020110043489     4/2011
                  (Continued)

OTHER PUBLICATIONS

Vihriala et al, Frame Structure Design for Future Millimetre Wave Mobile Radio Access, IEEE, 6 pages, 2016.*
(Continued)

*Primary Examiner* — Frank Duong
(74) *Attorney, Agent, or Firm* — Lee Hong Degerman Kang Waimey

(57) ABSTRACT

The present invention discloses a method for transmitting a reference signal and a device therefor in a wireless communication system. In particular, the method maps and transmits a DMRS signal to at least one OFDM symbol in a resource region for uplink data, and in the at least one OFDM symbol, a resource element to which the DMRS signal has not been mapped cannot be used for the uplink data.

16 Claims, 22 Drawing Sheets

Related U.S. Application Data

(60) Provisional application No. 62/444,306, filed on Jan. 9, 2017.

(51) Int. Cl.

| | | |
|---|---|---|
| *H04L 27/26* | (2006.01) |
| *H04B 7/0417* | (2017.01) |
| *H04L 1/00* | (2006.01) |
| *H04W 72/04* | (2009.01) |
| *H04B 7/04* | (2017.01) |
| *H04W 56/00* | (2009.01) |

(52) U.S. Cl.
CPC ............ *H04L 5/005* (2013.01); *H04L 5/0057* (2013.01); *H04L 27/2613* (2013.01); *H04W 72/0446* (2013.01); *H04B 7/04* (2013.01); *H04L 1/0001* (2013.01); *H04W 56/001* (2013.01)

(58) Field of Classification Search
CPC ..... H04L 5/0051; H04L 5/0057; H04L 27/26; H04L 27/2613; H04W 72/04; H04W 72/042
See application file for complete search history.

(56) References Cited

U.S. PATENT DOCUMENTS

| | | | |
|---|---|---|---|
| 9,648,588 B2 | 5/2017 | Kim et al. | |
| 9,667,395 B2 | 5/2017 | Jongren et al. | |
| 9,936,486 B2* | 4/2018 | You .................. | H04L 5/0051 |
| 10,142,074 B2* | 11/2018 | Wang .................. | H04L 5/0051 |
| 2013/0039332 A1 | 2/2013 | Nazar et al. | |
| 2013/0064227 A1 | 3/2013 | Iwai et al. | |
| 2013/0196675 A1 | 8/2013 | Xiao et al. | |
| 2013/0244676 A1 | 9/2013 | Koivisto et al. | |
| 2013/0336282 A1 | 12/2013 | Nakano et al. | |
| 2014/0293900 A1 | 10/2014 | Takeda et al. | |
| 2015/0029874 A1 | 1/2015 | Davydov et al. | |
| 2015/0230211 A1 | 8/2015 | You et al. | |
| 2015/0245326 A1 | 8/2015 | Rune et al. | |
| 2015/0280872 A1 | 10/2015 | Berggren et al. | |
| 2016/0057742 A1 | 2/2016 | Berggren et al. | |
| 2016/0100398 A1 | 4/2016 | Xia et al. | |
| 2017/0093538 A1 | 3/2017 | Yoon et al. | |
| 2017/0117998 A1 | 4/2017 | Jitsukawa | |
| 2017/0201989 A1 | 7/2017 | Fakoorian et al. | |
| 2017/0208588 A1 | 7/2017 | Park et al. | |
| 2017/0214518 A1 | 7/2017 | Oh et al. | |
| 2017/0294926 A1 | 10/2017 | Islam et al. | |
| 2017/0302495 A1 | 10/2017 | Islam et al. | |
| 2018/0041259 A1 | 2/2018 | Kim et al. | |
| 2018/0091350 A1 | 3/2018 | Akkarakaran et al. | |
| 2018/0123657 A1 | 5/2018 | Kundargi et al. | |
| 2018/0145854 A1 | 5/2018 | Akkarakaran et al. | |
| 2018/0167237 A1 | 6/2018 | Gudovskiy et al. | |
| 2018/0227867 A1 | 8/2018 | Park et al. | |
| 2018/0241508 A1 | 8/2018 | Chervyakov et al. | |
| 2018/0331804 A1 | 11/2018 | Hessler et al. | |
| 2018/0351720 A1 | 12/2018 | Ouchi et al. | |
| 2018/0359071 A1 | 12/2018 | Lee et al. | |
| 2018/0367275 A1 | 12/2018 | Nammi et al. | |
| 2019/0081825 A1 | 3/2019 | Pajukoski et al. | |
| 2019/0081844 A1 | 3/2019 | Lee et al. | |
| 2019/0108747 A1 | 4/2019 | Stenning et al. | |
| 2019/0109747 A1 | 4/2019 | Hessler et al. | |
| 2019/0123864 A1 | 4/2019 | Zhang et al. | |
| 2019/0140799 A1 | 5/2019 | Gao et al. | |
| 2019/0141653 A1 | 5/2019 | Lee et al. | |
| 2019/0222385 A1 | 7/2019 | Hessler et al. | |
| 2019/0261380 A1 | 8/2019 | Iyer et al. | |

FOREIGN PATENT DOCUMENTS

| | | |
|---|---|---|
| KR | 1020110117032 | 10/2011 |
| KR | 1020150018301 | 2/2015 |
| KR | 101577518 | 12/2015 |
| KR | 101647868 | 8/2016 |
| WO | 2016159673 | 10/2016 |
| WO | 2017138880 | 8/2017 |
| WO | 2018126399 | 7/2018 |

OTHER PUBLICATIONS

LG Electronics, DMRS Design Issues in NR, 3GPP TSG RAN WG1 Meeting #86bis, 8 pages, Oct. 2016.*
Ericsson, Demodulation reference signal design principles, 3GPP TSG-RAN WG1 #87, 4 pages, Nov. 2016.*
Ericsson, DMRS placement in transmission slots aggregation, 3GPP TSG-RAN WG1 #87, 7 pages, Nov. 2016.*
LG Electronics, "DMRS Design Issues in NR", 3GPP TSG RAN WG1 Meeting #86bis, R1-1609259, Oct. 2016, 8 pages.
Intel, "Discussion on DM-RS design for NR", 3GPP TSG RAN WG1 Meeting #86bis, R1-1610429, Oct. 2016, 7 pages.
PCT International Application No. PCT/KR2018/000152, Written Opinion of the International Searching Authority dated Apr. 9, 2018, 11 pages.
PCT International Application No. PCT/KR2018/000238, Written Opinion of the International Searching Authority dated Apr. 20, 2018, 10 pages.
LG Electronics, "DMRS Design Principle", 3GPP TSG RAN WG1 Meeting #87, R1-1611812, Nov. 2016, 7 pages.
Huawei, et al., "Functionalities and design of reference signal for demodulation of UL Channels", 3GPP TSG RAN WG1 Meeting #87, R1-1611246, Nov. 2016, 6 pages.
Qualcomm, "Views on UL DMRS design", 3GPP TSG RAN WG1 Meeting #87, R1-1612050, Nov. 2016, 5 pages.
LG Electronics, "Discussion on Phase Tracking RS for Multi-Antenna", 3GPP TSG RAN WG1 Meeting #87, R1-1611811, Nov. 2016, 7 pages.
Ericsson, "Design considerations for phase noise tracking RS (PTRS)", 3GPP TSG RAN WG1 Meeting #87, R1-1612333, Nov. 2016, 5 pages.
Xinwei, "Discussion on RS Design and QCL Related Issues", 3GPP TSG RAN WG1 Meeting #87, R1-1612257, Nov. 2016, 6 pages.
NTT DOCOMO, "Views on RS for phase tracking", 3GPP TSG RAN WG1 Meeting #87, R1-1612720, Nov. 2016, 6 pages.
U.S. Appl. No. 16/359,932, Office Action dated May 23, 2019, 25 pages.
U.S. Appl. No. 16/065,125, Office Action dated May 24, 2019, 18 pages.
U.S. Appl. No. 16/065,108, Office Action dated Jul. 11, 2019, 19 pages.
LG Electronics, "Discussion on DMRS density and structure to handle high Doppler case", R1-156894, 3GPP TSG RAN WG1 Meeting #83, Nov. 2015, 14 pages.
United States Patent and Trademark Office U.S. Appl. No. 16/065,125, Final Office Action dated Nov. 21, 2019, 24 pages.
European Patent Office Application Serial No. 18735957.5, Search Report dated Jan. 17, 2020, 9 pages.
European Patent Office Application Serial No. 18735833.8, Search Report dated Jan. 17, 2020, 10 pages.
Nokia et al., "On reference symbol types in NR", R1-1612854, 3GPP TSG-RAN WG1#87, Nov. 2016, 4 pages.
Mitsubishi Electric, "On common RS design between DFT-S-OFDM and OFDM", R1-1612375, Nov. 2016, 4 pages.

* cited by examiner

FIG. 2
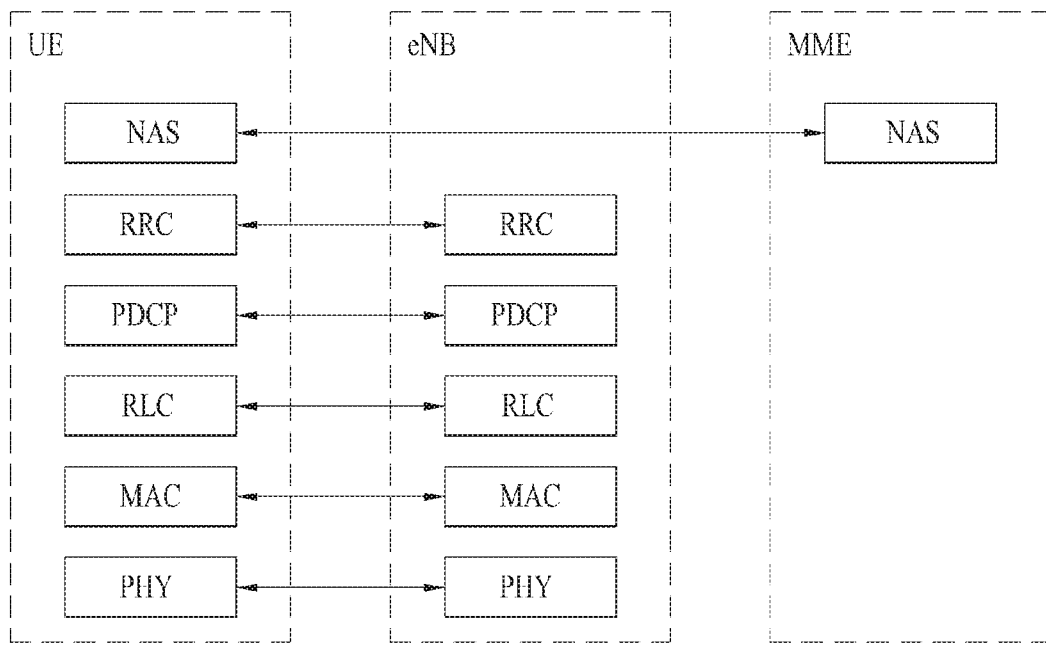
(A) CONTROL-PLANE PROTOCOL STACK
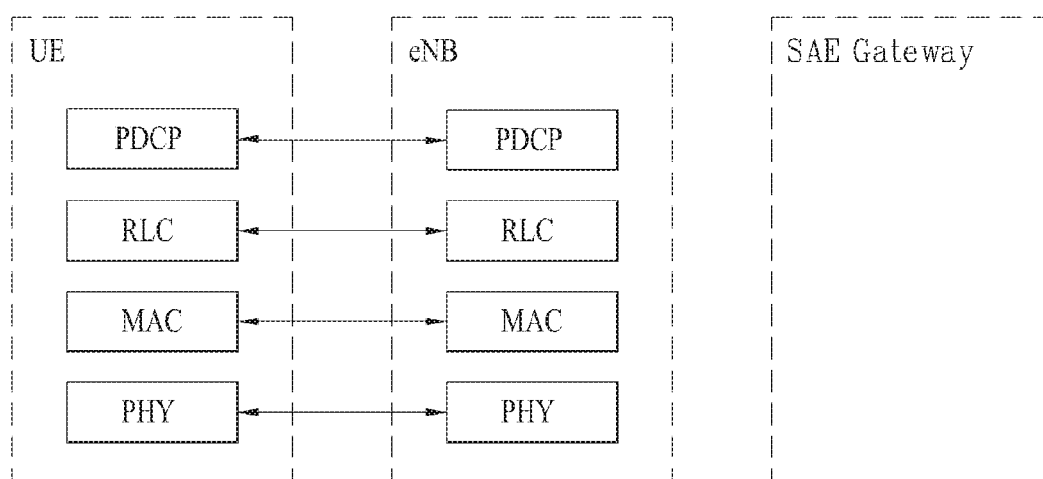
(B) USER-PLANE PROTOCOL STACK

☒ : DMRS GROUP 1

☒ : DMRS GROUP 2

(A)  (B)

METHOD FOR TRANSMITTING REFERENCE SIGNAL AND DEVICE THEREFOR IN WIRELESS COMMUNICATION SYSTEM

CROSS-REFERENCE TO RELATED APPLICATIONS

This application is a continuation of U.S. patent application Ser. No. 16/065,108, filed on Oct. 1, 2018, currently pending, which is the National Stage filing under 35 U.S.C. 371 of International Application No. PCT/KR2018/000152, filed on Jan. 4, 2018, which claims the benefit of U.S. Provisional Application No. 62/444,306, filed on Jan. 9, 2017, the contents of which are all hereby incorporated by reference herein in their entirety.

TECHNICAL FIELD

The present invention relates to a method and apparatus for transmitting a reference signal in a wireless communication system and, more particularly, a method and apparatus for determining whether data is transmitted through a symbol in which a reference signal is deployed and transmitting the signal.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required

DISCLOSURE

Technical Problem

An object of the present invention devised to solve the problem lies in a method and apparatus for transmitting a reference signal in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

The object of the present invention can be achieved by providing a method of transmitting a demodulation reference signal (DMRS) by a user equipment (UE) in a wireless communication system, the method including mapping the DMRS signal to at least one orthogonal frequency division multiplexing (OFDM) symbol in a resource region for uplink (UL) data and transmitting the DMRS signal, wherein a resource element to which the DMRS signal is not mapped in the at least one OFDM symbol is not used for the UL data.

The DMRS signal may be transmitted using a DFT-S-OFDM method or a CP-OFDM method.

A DMRS mapping pattern using the DFT-S-OFDM method and a DMRS mapping pattern using the CP-OFDM method may be the same.

The DMRS may be mapped to the at least one OFDM symbol at predetermined subcarrier spacing.

A DMRS using the DFT-S-OFDM method and a DMRS using the CP-OFDM method may be generated based on different types of sequences.

Mapping positions of the DMRS using the DFT-S-OFDM method and the DMRS using the CP-OFDM may be different from each other.

The method may further include receiving information on a size of a resource block for transmitting UL data, and transmitting UL data transmitted through the OFDM symbol to which the DMRS is not mapped, based on the size of the received resource block.

The method may further include receiving control information on a resource element that is not used for transmitting UL data in the at least one OFDM symbol, wherein the UL data is not mapped to the resource element to which the DMRS signal is not mapped, based on the control information.

In another aspect of the present invention, provided herein is a user equipment (UE) for transmitting a demodulation reference signal (DMRS) in a wireless communication system, including a radio frequency (RF) module configured to transmit and receive a wireless signal to and from a base station (BS), and a processor connected to the RF module and configured to map the DMRS signal to at least one orthogonal frequency division multiplexing (OFDM) symbol in a resource region for uplink (UL) data and to transmit the DMRS signal, wherein a resource element to which the DMRS signal is not mapped in the at least one OFDM symbol is not used for the UL data.

The DMRS signal may be transmitted using a DFT-S-OFDM method or a CP-OFDM method.

A DMRS mapping pattern using the DFT-S-OFDM method and a DMRS mapping pattern using the CP-OFDM method may be the same.

The DMRS may be mapped to the at least one OFDM symbol at predetermined subcarrier spacing.

A DMRS using the DFT-S-OFDM method and a DMRS using the CP-OFDM method may be generated based on different types of sequences.

Mapping positions of the DMRS using the DFT-S-OFDM method and the DMRS using the CP-OFDM may be different from each other.

Information on a size of a resource block for transmitting UL data may be received, and UL data transmitted through the OFDM symbol to which the DMRS is not mapped may be transmitted based on the size of the received resource block.

The processor may receive control information on a resource element that is not used for transmitting UL data in the at least one OFDM symbol, through the RF module and the UL data may not be mapped to the resource element to which the DMRS signal is not mapped, based on the control information.

Advantageous Effects

According to the present invention, data is differently deployed in a symbol in which a reference signal is transmitted according to overhead and MIMO gain of the reference signal to effectively transmit a signal.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram for structures of control and user planes of radio interface protocol between a 3GPP radio access network standard-based user equipment and E-UTRAN;

BEST MODE

Figure 1:
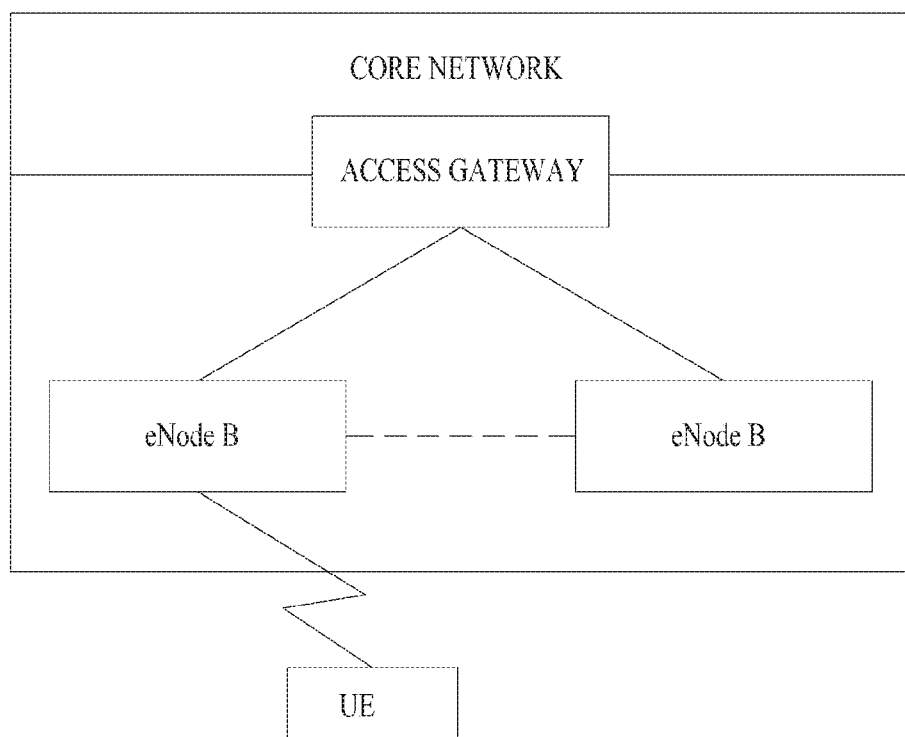
FIG. 1 is a schematic diagram of E-UMTS network structure as one example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
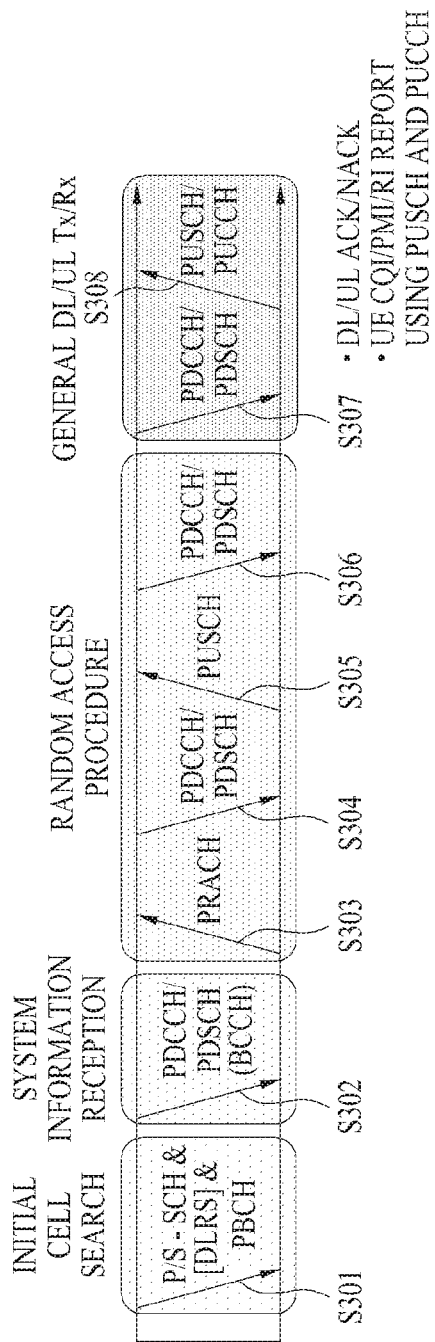
FIG. 3 is a diagram for explaining physical channels used for 3GPP system and a general signal transmission method using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
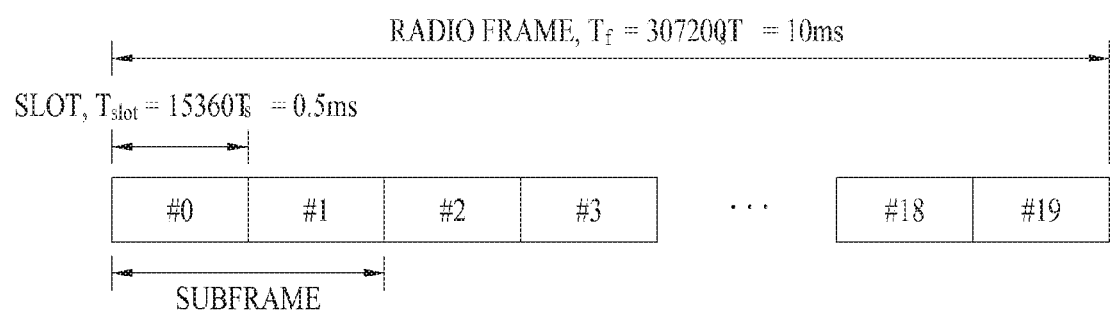
FIG. 4 is a diagram for a structure of a radio frame in LTE system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s$=1/(15 kHz×2048)=3.2552×10$^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
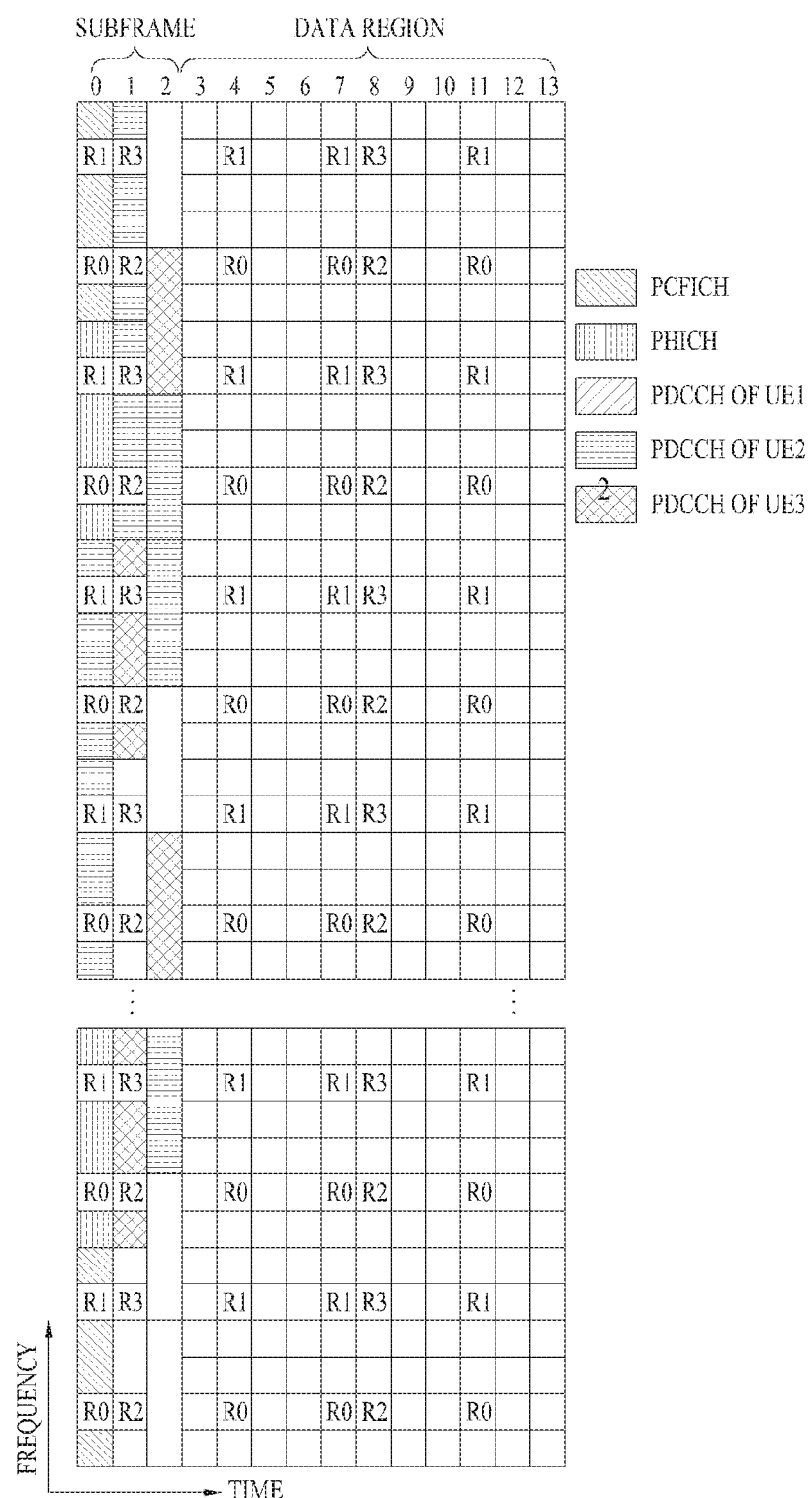
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
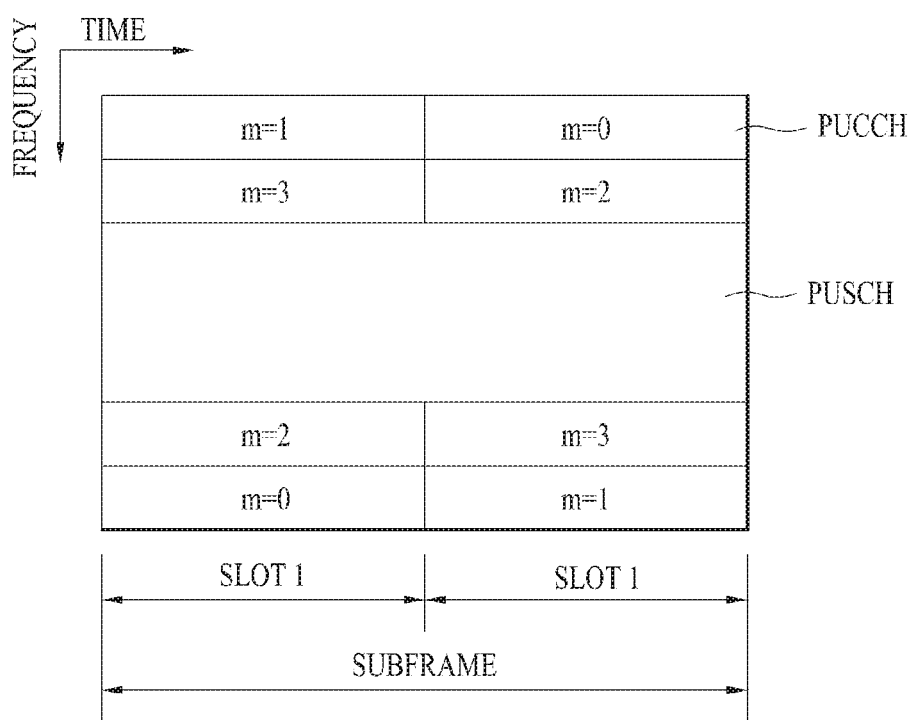
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 7:
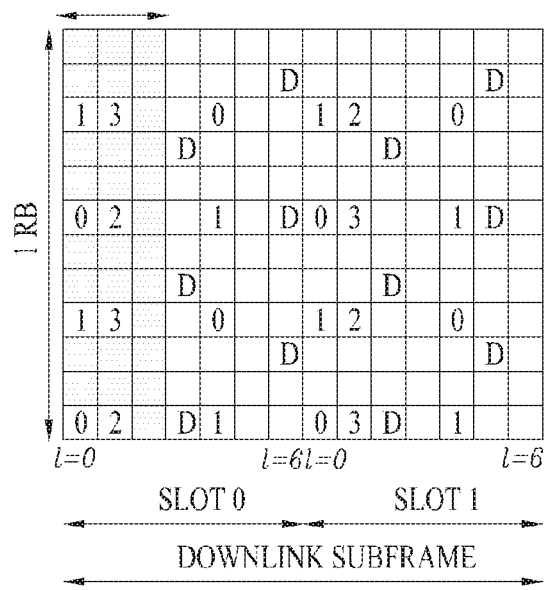
FIGS. 7 and 8 illustrate downlink Reference Signal (RS) configurations in an LTE system supporting downlink transmission through four antennas (4-Tx downlink transmission)
Figure 8:
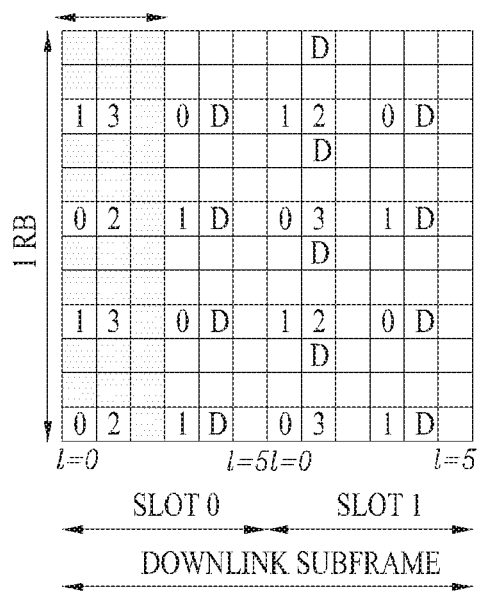

FIGS. 7 and 8 illustrate RS configurations in an LTE system supporting DL transmission through four antennas (4-Tx DL transmission). Specifically, FIG. 7 illustrates an RS configuration in the case of a normal CP and FIG. 8 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Figure 9:
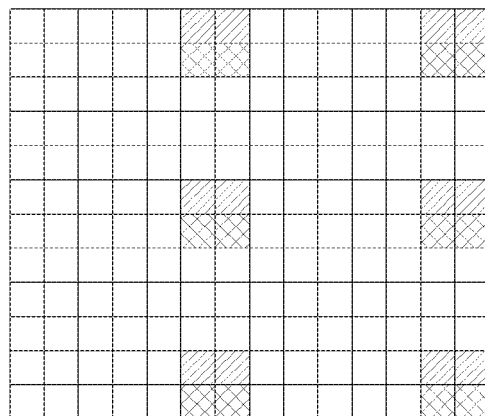
FIG. 9 illustrates an exemplary downlink Demodulation Reference Signal (DMRS) allocation defined in a current 3GPP standard specification.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

FIG. 9 illustrates an exemplary DL DMRS allocation defined in a current 3GPP standard specification.

Referring to FIG. 9, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2). As compared to CRS, CSI-RS was proposed for channel measurement of a PDSCH and up to 32 different resource configurations are available for CSI-RS to reduce Inter-Cell Interference (ICI) in a multi-cellular environment.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 10:
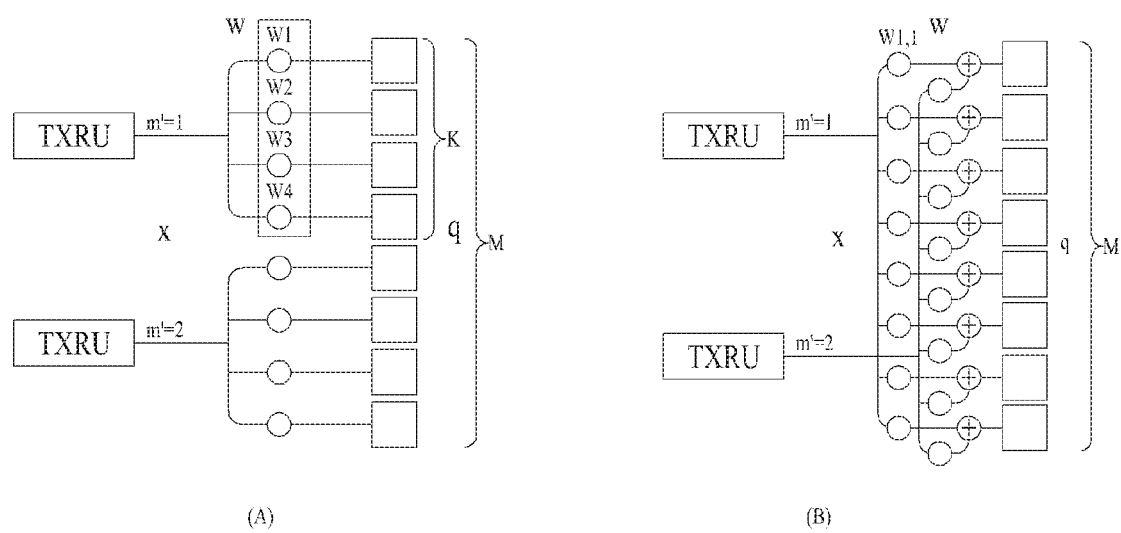
FIG. 10 illustrates examples of a connection scheme between TXRUs and antenna elements.

FIG. 10 illustrates examples of a connection scheme between TXRUs and antenna elements.

(a) of FIG. 10 illustrates that TXRU is connected to a sub-array. In this case, the antenna elements are connected to only one TXRU. Unlike (a) of FIG. 10, (b) of FIG. 10 illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
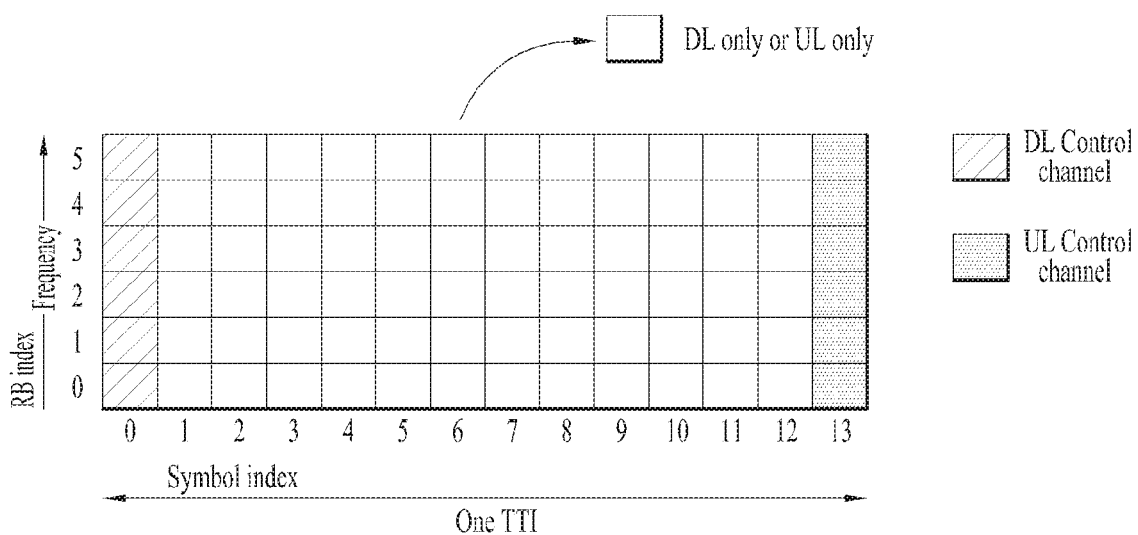
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period The $5^{th}$ generation new radio (NR) may have the following problem in DMRS transmission according to the characteristics of an NR system. First, design requirements of an NR system need to be configured in such a way that a frequency band ranges from 700 MHz to 70 GHz, a system bandwidth ranges from 5 MHz to 1 GHz, mobile velocity ranges from 0 km/h to 500 km/h to enable communication, and communication is enabled in an indoor/outdoor environment, a large cell, etc. and, thus, the design requirements of the NR system are considerably diverse.

Accordingly, there is a need for a method of deploying DMRSs to satisfy such diverse design requirements and, in this regard, design of an NR DMRS using a single pattern on the assumption of an extreme environment may be considerably inefficient in terms of resource efficiency. On the other hand, design of the NR DMRS using various patterns is problematic in that implementation complexity increases.

Second, for the purpose of aiding in early decoding of data and measuring and eliminating inter-cell interference, a DMRS of an NR system may be located at a start part of a data channel. In this case, in a channel situation, e.g., high Doppler, low SNR, etc., when a DMRS located at a front part of a subframe is used, low channel estimation performance may be obtained.

Third, the number of layers that can be received per user is 8 in LTE-A, but may increase to 16 or more in NT due to massive MIMO. Accordingly, orthogonality is needed to distinguish between DMRS antenna ports. Since RS overhead increases according to the number of layers, it is necessary to efficiently configure orthogonal resources for distinguishing between a large number of layers.

Fourth, since a high frequency band is used in NR, pathloss may be severe. To overcome this, beamforming is introduced in NR. That is, the possibility that an eNB in a band of 4 GHz introduces analog beamforming, i.e., analog Rx beamforming in UL may be high, and the possibility that both the eNB and a UE in a band of 6 GHz or more introduce analog beamforming may increase.

When a signal is transmitted and received in a legacy omnidirection, features of delay spread and Doppler spread may differently appear while analog beamforming is applied. For example, Doppler spread increasingly appears when a signal is received in an omnidirection and, when velocity increases, a coherent time decreases. In this case, when analog Rx beamforming is introduced, only a Doppler frequency of a signal received in a specific direction appears and, therefore, Doppler spread relatively decreases and thus the coherent time increases. In this case, there may be a problem in that a DMRS additionally applied for high velocity creates unnecessary overhead.

To overcome the aforementioned problem, the present invention defines a method of deploying DMRSs and an added RS other than a legacy DMRS and proposes a method of deploying and transmitting the added RSs.

Prior to a detailed description of the present invention, in the present invention, the legacy RS may be referred to a basic DMRS, a fundamental DM-RS, or the like, and the added RS may be referred to as an additional RS, a high quality RS, a high performance RS, a supplemental DM-RS, a secondary DM-RS, an add-on DMRS, or the like.

<Positions of Basic DMRS and Additional DMRS>

According to the present invention, a DMRS of NR includes a basic RS (i.e., basic DMRS) located at a front part of a data region of a subframe and an additional RS (i.e., additional DMRS) transmitted in the data region of the subframe.

The basic DMRS refers to an RS which is always transmitted irrespective of a link, i.e., DL, UL, special link (SL), or the like, numerology such as subcarrier spacing or OFDM symbol duration, a transmission layer, a deployment scenario about where a UE is positioned indoor or outdoor, etc., velocity of a UE, a TBS size, etc.

In NR, the basic DMRS is located at a front part of a data region of a subframe. In NR, early decoding of data is an important requirement of design. By transmitting the DMRS prior to a data signal, channel estimation information necessarily demanded for data decoding can be rapidly obtained.

A factor that should be considered in association with the position of the basic DMRS is that a frame structure in NR is designed to commonly use DL/UL/SL and DMRS positions of DL, UL, and SL should be equal in a subframe to estimate a channel of an interference signal received from a neighbor cell or a neighbor link.

In a subframe structure considered in NR, starting points of a DL data region and a UL data region may differ according to the length of a DL control region and presence of a guard period. For example, if DL data is transmitted after the first OFDM symbol on which a control channel is transmitted, the data region may be started starting from the second OFDM symbol. If UL data is transmitted after the first OFDM symbol on which the control channel is transmitted, the second OFDM symbol may be used as a guard period and data may be transmitted starting from the third OFDM symbol.

Figure 12:
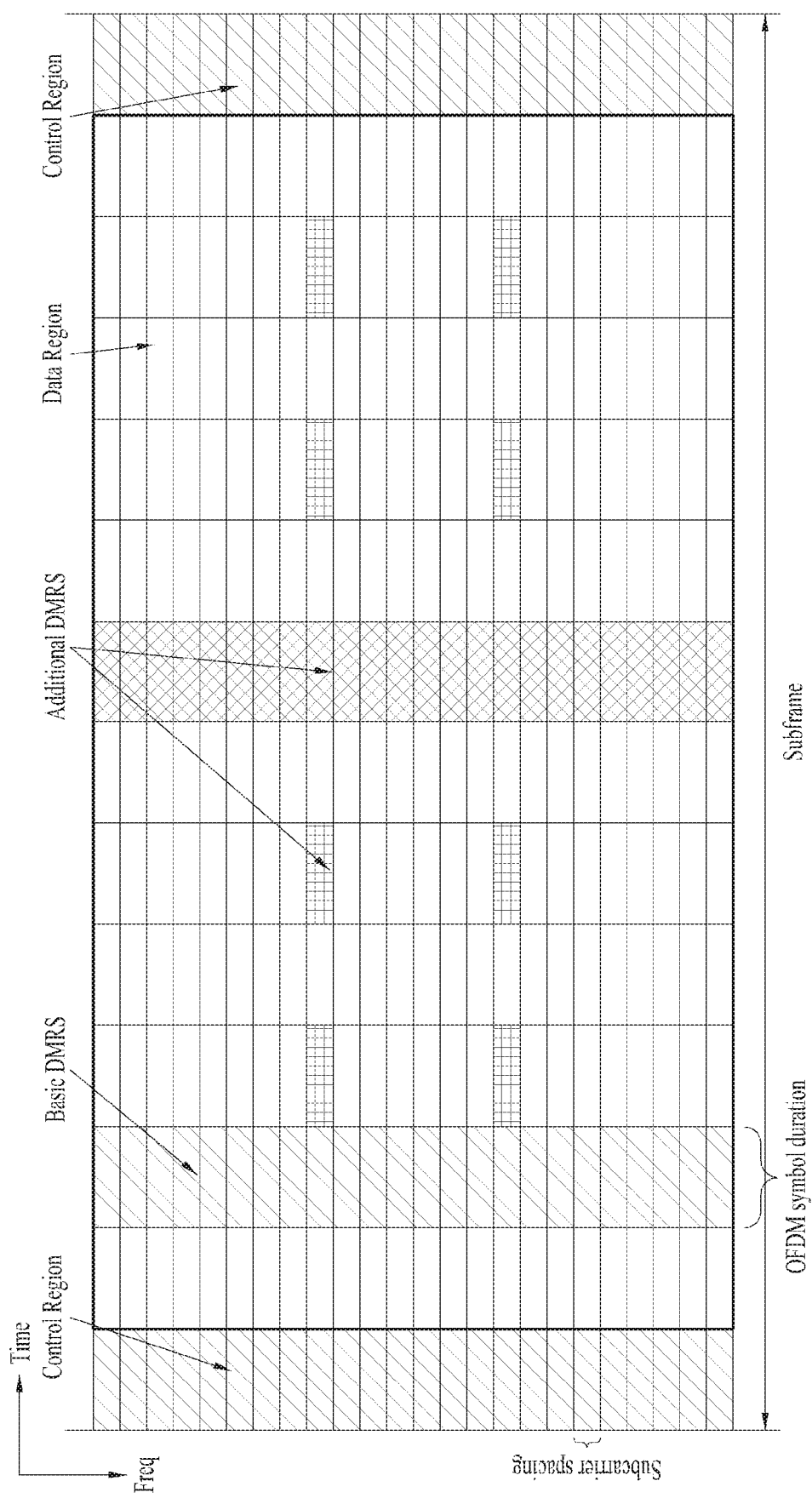
FIGS. 12 and 13 illustrate an example in which a basic DMRS and an additional DMRS are transmitted in a self-contained subframe.

As such, since the starting points of the DL data and the UL data may differ, it is desirable to deploy the basic DMRS on the first symbol among OFDM symbols commonly used for data transmission in a DL data region and a UL data region, as shown in FIG. 12.

Figure 13:
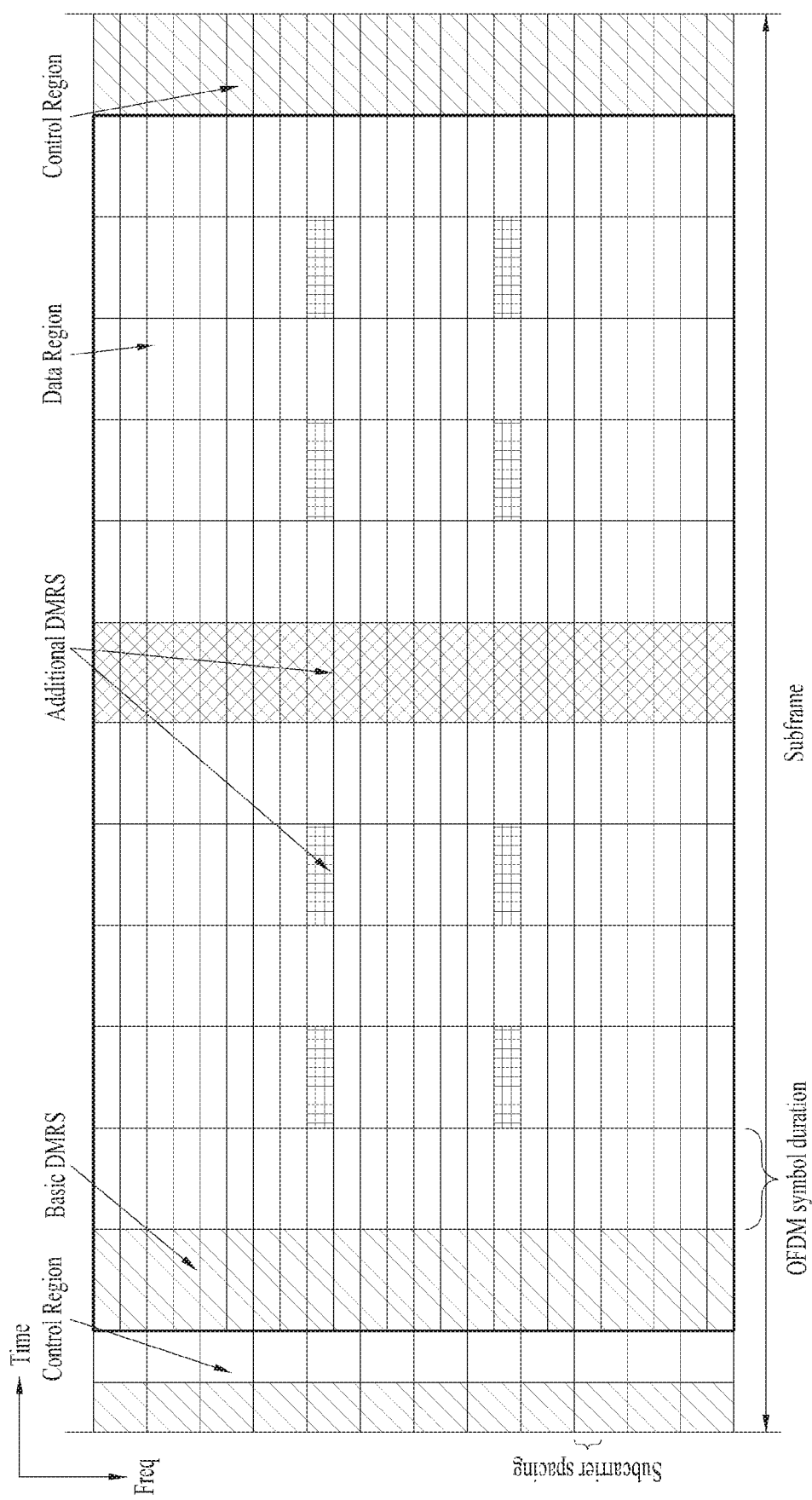

The length of OFDM symbols of a control region and the length of OFDM symbols of a data region may differ. Even in this case, as shown in FIG. 13, the basic DMRS may be deployed on the first OFDM symbol among OFDM symbols commonly used for data transmission in the DL data region and the UL data region after OFDM symbols occupied by the DL control region and a guard time.

The additional DMRS may be located at a specific position of the data region and may be divided into two types as follows.

Type-1 Additional DMRS may use a part of REs and Type-2 Additional DMRS may use all of OFDM symbols.

In the case of Type-1 Additional DMRS, the additional DMRS may be deployed as follows.

1. Embodiment 1-1

An additional DMRS is divided into levels according to the number of REs of the additional DMRS, and the number of REs of the additional DMRS, that is, an additional DMRS level, is adjusted according to a transmission environment. In this case, one of multiple additional DMRS levels corresponds to the case in which only a basic RS is transmitted. Typically, additional DMRS level 0 may correspond to the case in which only the basic RS is transmitted.

2. Embodiment 1-2

The additional DMRS in units of REs may be deployed at an equal interval in a resource block. In general, the additional DMRS in units of REs may define APs having the same number as APs defined by the basic DMRS. However, in the case in which the additional DMRS in units of REs is used to measure phase variations between OFDM symbols and for a special purpose like the case in which variations are similar in all APs, only the additional DMRS of APs having less number than APs defined in the basic DMRS may be defined.

In the case of Type-2 Additional DMRS, the additional DMRS may be deployed as follows.

1. Embodiment 1-1

If the additional DMRs are used in units of OFDM symbols, the additional DMRS may be deployed at a position in which the number of OFDM symbols located after an OFDM symbol used as the basic DMRS is similar to the number of OFDM symbols located after the OFDM symbol used as the additional DMRS. For example, if 12 OFDM symbols are present in a data region and the basic DRMS is located on the second OFDM symbol, the additional DMRS is deployed on the seventh OFDM symbol. As another example, if 12 OFDM symbols are present in the data region and the basic DRMS and two additional DRMSs are present, when the basic DMRS and the two additional DRMSs are deployed on the first, fifth, and ninth OFDM symbols, respectively, the numbers of OFDM symbols after the respective DMRSs are similar. This is advantageous in that the DMRS well reflects channel estimation variation.

2. Embodiment 1-2

If the additional DMRS is used in units of OFDM symbols, the position of the additional DMRS may be deployed on an OFDM symbol subsequent to an OFDM symbol used as the basic DMRS. For example, if the basic DMRS is located on the second OFDM symbol, the additional DMRS is deployed on the third OFDM symbol. This has advantages of extending the number of antenna ports in multiple antenna transmission or increasing DMRS resources for the purpose of extending users on which simultaneous transmission is performed.

<Method of Varying Density of DMRSs>

As a first method of varying density of DMRSs, an additional RS may be added on an on-demand basis while maintaining a legacy RS. For example, such an additional RS may be added in the case in which Doppler or delay spread increases or in a high modulation and coding scheme (MCS) according to an MCS level.

As a second method of varying density of DMRSs, more RSs may be transmitted or fewer RSs may be transmitted on an on-demand basis to a user that permits density variation according to capability of a receiver. For example, if the receiver is capable of performing analog beamforming, it is requested that fewer RSs be transmitted on an on-demand basis with respect to RSs transmitted on the assumption of omnidirectional reception.

As a third method, in a channel over which a paging signal, a random access response, and system information are transmitted, density of RSs may be fixed, and in a channel over which information is transmitted to a specific UE, density of RSs may be varied.

As a fourth method, RS density control information may be defined through grant messages for channel decoding. In addition, the RS density control information may include the following information.

Information about RS density to be used over a currently transmitted channel or a channel to be transmitted (e.g., information on whether default density is used and information on a degree by which density is increased compared with default density)

Information about an additional DMRS level

Information about an additional DMRS type

Triggering message for reporting a channel variation

As a fifth method, after performing short-term measurement using CSI-RS, a UE may report a channel variation of time and frequency together with channel state information (CSI) report. Reporting of the channel variation may be an index for determining whether to vary RS density. In addition, the UE may transmit a message for making a request for varying of RS density.

As a sixth method, upon reporting CSI, the UE may report information about a preferred additional DMRS level. The preferred additional DMRS level corresponds to an additional DMRS level that can obtain optimal throughput while the UE receives a PDSCH of an MCS corresponding to a reported CQI included in the CSI reporting. In this case, upon calculation of the CSI, the UE may factor in added DM-RS RE overhead according to the additional DMRS level As a seventh method, when transmission layers increase, an additional RS may be added to a legacy RS.

In a data region indicated by a common control channel or a common control message, an additional DMRS may be basically deployed together with a basic DMRS.

When data is indicated by a UE-specific control channel or a UE-specific control message, DMRS density in a subframe is variably used. To this end, a DMRS related indicator may be configured in the control message. That is, DMRS density for a PDSCH or a PUSCH may be indicated through the control message. The control message configured by the DMRS related indicator may be transmitted in DCI to the UE or may be transmitted to the UE via RRC signaling. In this case, according to a DCI format, whether the control message is included may be changed or a form in which the control message is included may be changed. In addition, the UE that performs analog reception beamforming may make a request for change in the DMRS density and, thus, may change the DMRS density in an eNB end.

Figure 14:
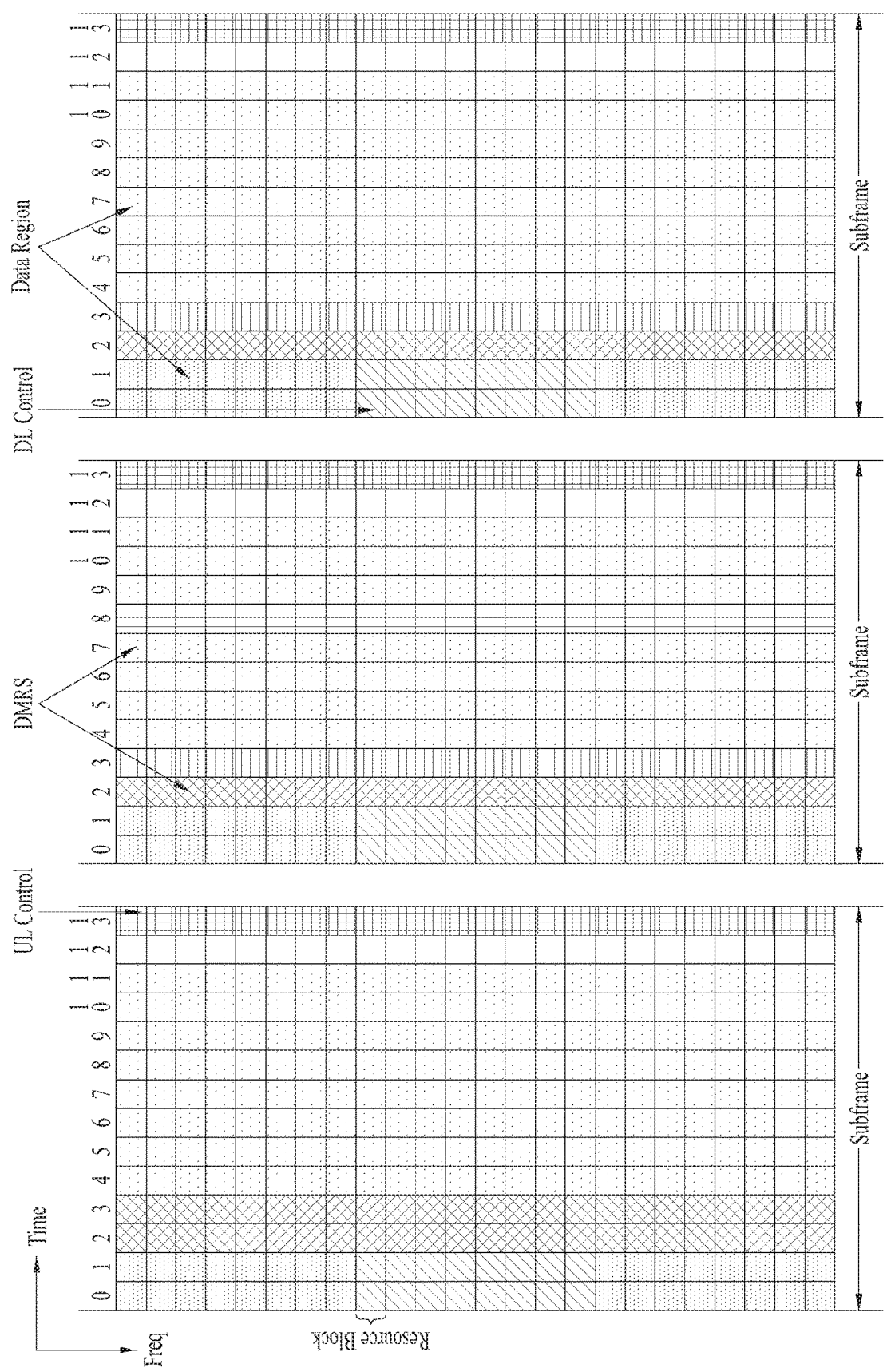
FIGS. 14 and 15 are diagrams showing an example of DMRS transmission for DL data and UL data.
Figure 15:
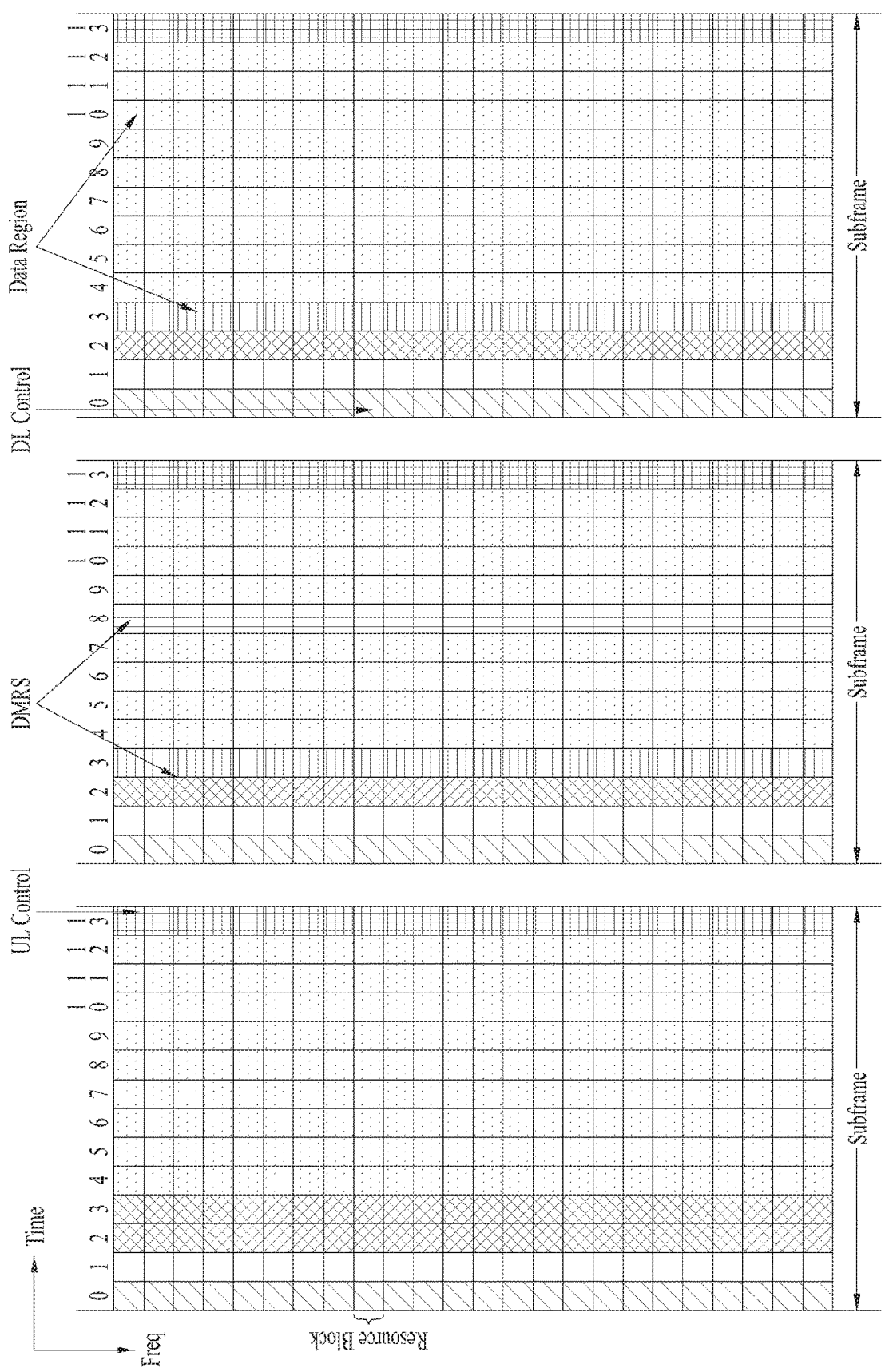

FIGS. 14 and 15 are diagrams showing an example of DMRS transmission according to the present invention. That is, FIGS. 14 and 15 illustrate an embodiment in which a Type-2 additional DMRS is categorized into Level 0 and Level 1 according to overhead and DMRS is transmitted according to each level.

Referring to FIGS. 14 and 15, DMRS positions in UL and DL transmission regions are equalized with each other according to a level of Type-2 additional DMRSs. Level 1 corresponds to the case of increasing overhead and may be applied for the purpose of improving channel estimation performance during higher rank transmission or lower rank transmission. Level 0 is targeted at lower rank transmission having low RS overhead.

As another example, in FIGS. 14 and 15, "A. Level 1 (Higher Rank)" may be used to improve channel estimation performance during lower rank transmission and "B. Level 1 (Lower Rank)" may be used as a pattern for a higher rank.

In the illustrated frame structures illustrated in FIGS. 14 and 15, it is assumed that 2 OFDM symbols be used in a DL control region and, in this case, DL data transmission may be possible through a region not used for DL control.

<Designation of Level that can Perform Interpolation for Improving Channel Estimation A quasi co-location (QCL) condition may be assumed in DMRSs transmitted as multiple levels.

For example, if QCL is assumed between a plurality of DMRSs transmitted in a single subframe, a channel estimated from each DMRS may be used for interpolation. If a QCL condition is assumed in multiple subframes, interpolation may be performed on a multi-subframe level basis.

When one or more mini subframes are defined in a subframe or a DMRS is transmitted for each mini subframe, interpolation between mini-subframes may be performed when QCL of a mini-subframe level is assumed. The QCL condition may represent a time-domain resource unit capable of performing interpolation as a subframe group or a multi-subframe group.

<RS Structure for Measuring Channel State Variation>

If a cell-specific reference signal (CRS), which is periodically transmitted at an interval of constant OFDM symbols, or a CSI-RS, which is periodically transmitted in units of subframes, as in legacy LTE is used, a time-varying channel characteristic may be measured.

However, in NR, a single-beamformed RS transmitted in units of one or more OFDM symbols, like a CRS is not defined. Here, the single beamforming refers to a beamforming type having no beam variation in time or frequency.

Since, in NR, a frame structure supporting dynamic switching of DL and/or UL and dynamic variation of a transmission beam in units of OFDM symbols and subframes is demanded, it is difficult to periodically transmit a CSI-RS in units of subframes and thus it is difficult to use the periodic CSI-RS. In addition, one-shot transmission makes it difficult to measure Doppler spread.

Even though a periodically transmitted RS for beam measurement is introduced, if the RS is not transmitted at a considerably short period, it is difficult to measure time-varying channel characteristic variation using the beam measurement RS.

Accordingly, a channel measurement RS such as a CSI-RS, a Sounding Reference Signal (SRS), etc. of NR needs to be designed to be suitable for measurement of time-varying channel state variation. To satisfy the requirements, the present invention proposes the following structure the RS for measurement of channel state variation.

Figure 16:
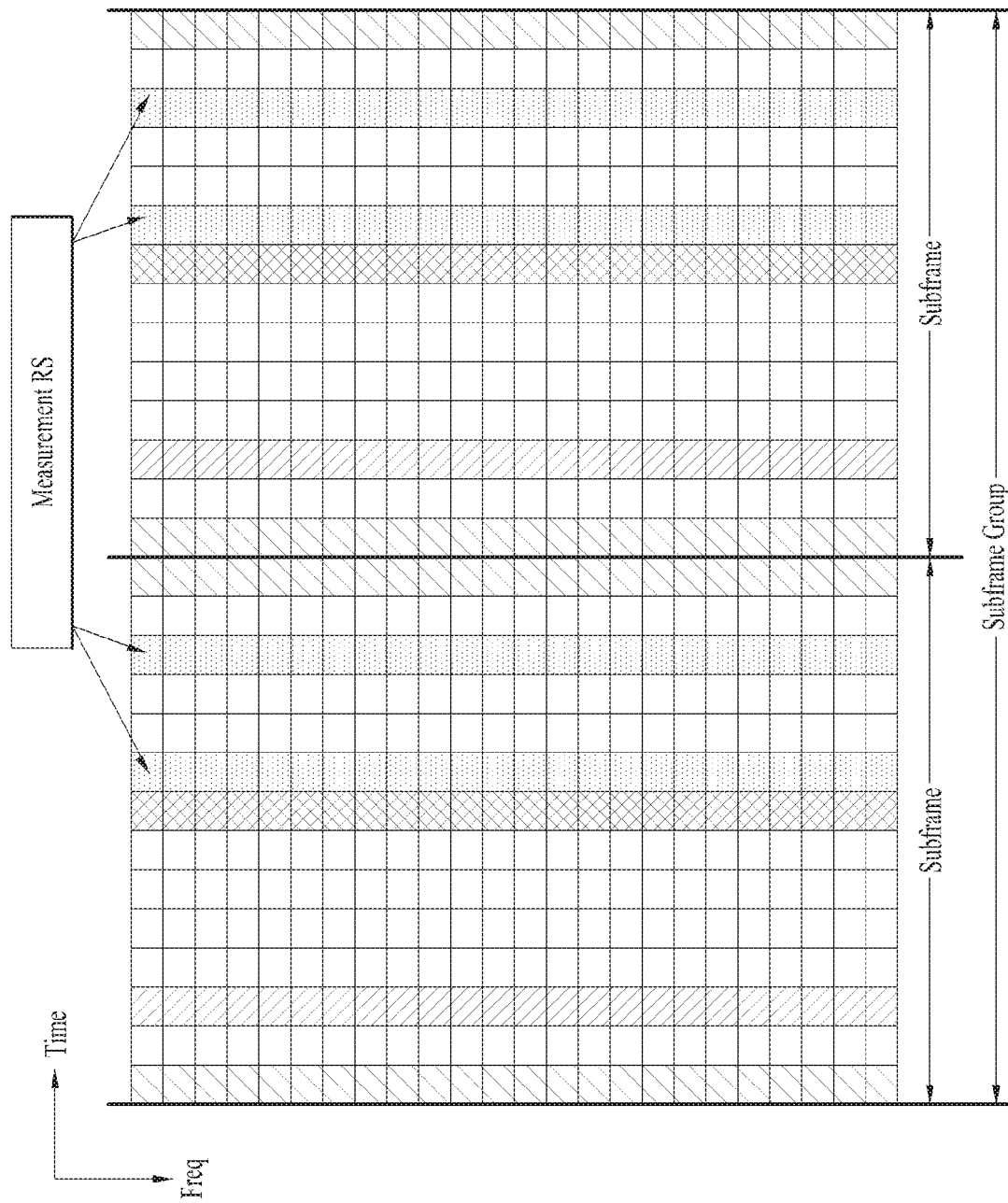
FIG. 16 illustrates an example of RS transmission for measurement of channel state variation.

(1) As shown in FIG. 16, a multi-shot CSI-RS or a multi-shot SRS having no variation in beamforming may be transmitted. To this end, a CSI-RS or a SRS may be transmitted in one subframe using a multi-shot method or the multi-shot CSI-RS or the multi-shot SRS may be transmitted in units of a plurality of subframes together with adjacent subframes. In addition, a message of an N-subframe group based on the premise that there is no variation in a beamforming coefficient may be generated.

In this case, a partial or entire portion of the CSI-RS or the SRS transmitted using the multi-shot method may be used as the RS for measurement of channel state variation.

(2) The RS for measurement of channel state variation may be repeatedly transmitted on a single OFDM symbol. In this case, the RS for measurement of channel state variation may be all or some of CSI-RS, SRS, or phase tracking reference signal (PTRS), allocated to the single OFDM symbol.

Upon triggering aperiodic CSI-RS transmission, CSI measurement, and CSI reporting through DCI, an eNB may inform a UE whether a corresponding CSI-RS is a single shot CSI-RS or a multi-shot CSI-RS. If the eNB transmits the multi-shot CSI-RS, the UE may report channel variation or a preferred additional DMRS level.

Similarly, upon triggering aperiodic SRS transmission through the DCI, the eNB may inform the UE whether a corresponding SRS is transmitted as a single shot SRS or a multi-shot SRS. Alternatively, when the eNB transmits the multi-shot SRS, the eNB may inform the UE of how many times an SRS should be consecutively transmitted using the same precoding scheme.

In addition, for efficient interference measurement, a CSI-Interference Measurement (IM) resource, which is a resource for specifying interference, may be configured as a multi-shot CSI-IM resource. The multi-shot CSI-IM resource may be defined to match a multi-shot CSI-RS resource in one-to-one correspondence. That is, the eNB may equalize the numbers of times that CSI-RS and CSI-IM resource are transmitted, through the DCI. Unlike this, the eNB may individually indicate, through the DCI, the numbers of times that CSI-RS and CSI-IM resource are transmitted.

<Method of Sharing RS of Control Channel and Data Channel>

In an NR system, a DL control channel and DL and/or UL data channels are considered to be time division multiplexed (TDMed). Basically, an RS for demodulation of a control channel and a DMRS for demodulation of a data channel may each be defined in the control channel.

However, when RSs for the respective channels are defined, there may be a problem in that RS overhead is significantly increased. Accordingly, as a method of reducing the RS overhead, a method of sharing a control channel RS or a data DMRS between a control channel and a data channel is discussed.

However, this sharing method is not always advantageous. For example, the RS of the control channel is defined for a limited number of APs and, in this regard, when the RS is applied to the data channel, maximum transmission rank of the data channel may be limited to function as a factor that limits performance.

In addition, the RS of the control channel may be a UE specific RS but may be a non-UE specific RS.

When the RS is transmitted in the non-UE specific RS, it may be difficult to perform beamforming on the data channel with respect to a specific user and, thus, it may be difficult to expect BF gain.

On the other hand, a UE in a specific situation may be permitted to share the RS. For example, the RS may be permitted to be shared in the cases 1) when a data channel is transmitted to a user that transmits information that requires a non-high data rate, 2) when UE-specific space channel information is not acquired or acquired space channel information is not effective, 3) when a data channel is transmitted to a user having an advantage in terms of open-loop transmission like in a high-speed mobility environment, etc.

Figure 17:
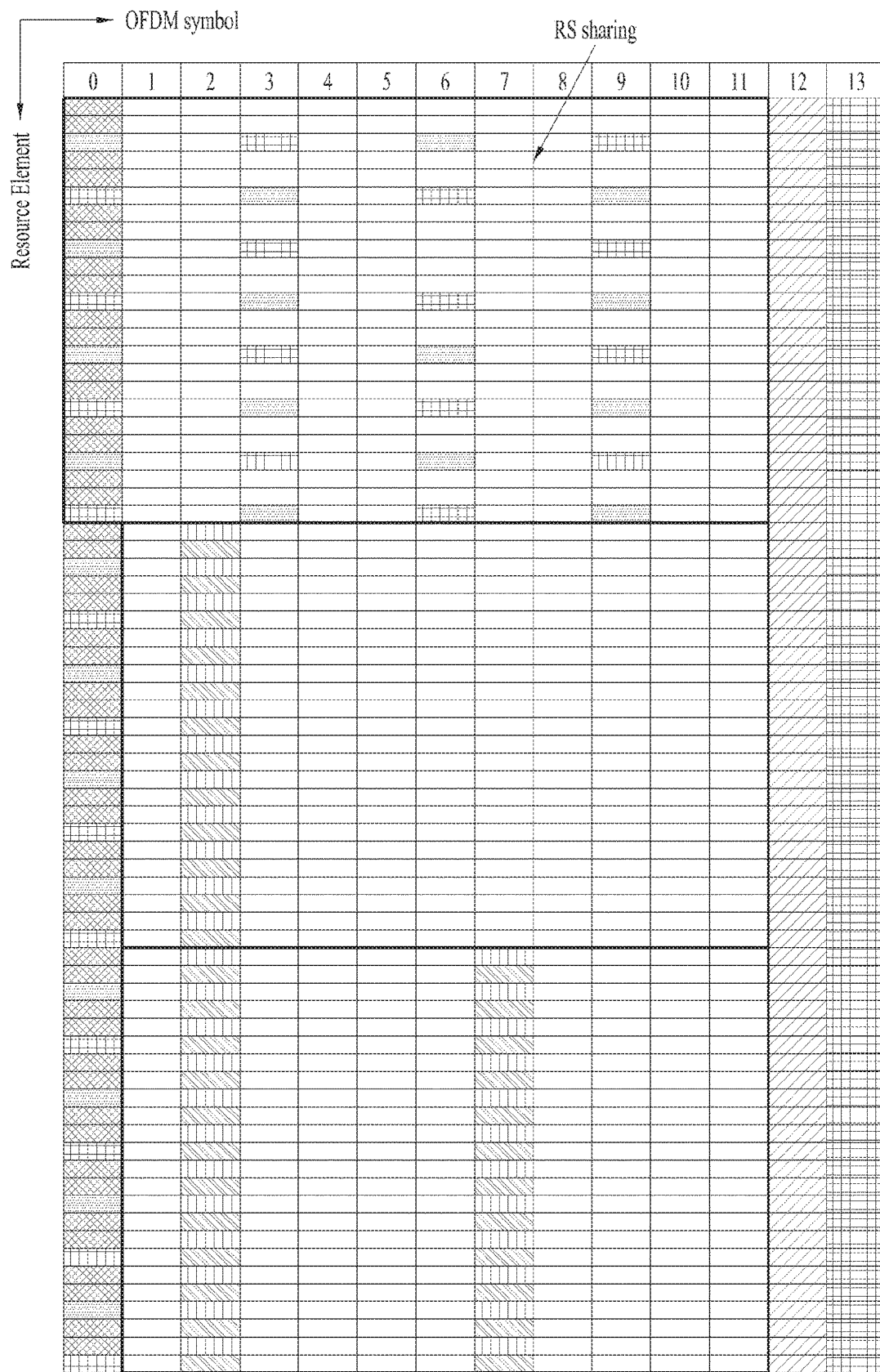
FIG. 17 is a diagram for explanation of an example of sharing of an RS between a control channel and a data channel.

Hereinafter, the method of sharing the RS is described with reference to FIG. 17. Referring to FIG. 17, the RS defined in the control channel may be shared by the data channel. In this case, the RS of the control channel may be assumed to be a UE group specific RS. In this case, there may be a problem in that the number of transmission layers is limited by the RS of the control channel and it is difficult to expect UE specific beamforming.

An RS of a DMRS region may not be used. In this case, the non-used RS region may be used for data.

The additional RS may be deployed in a data region that shares the RS of the control channel RS. In this case, RS overhead may not be largely increased based on one OFDM symbol DMRS. The additional RS may be deployed when a basic transmission or fallback method is used.

In addition, with respect to the RS sharing method, an eNB may notify a UE about information on a used RS. For example, the eNB may notify the UE about whether the RS defined in the control channel is used or the RS defined in the DMRS region is used.

Alternatively, according to attributes of a data channel transmitted to the UE, the used RS may be determined. For example, in conjunction with RNTI of DCI for transmitting system information, random access response, or the like, the RS of the control channel may be shared in a data channel indicated by the DCI detected from the corresponding RNTI.

In a data channel period for a user or user group that shares and uses the RS of the control channel in the data channel, similar or the same RS as the RS of the control channel may be additionally transmitted or may always be transmitted. This may be indicated via a high layer or the like and, to this end, a specific indicator may be defined in content of the control signal.

Here, sharing of an RS between the control channel and the data channel may mean that the RS of the control channel and the RS of the data channel use the same sequence or the same type of sequences.

<Support for Multiple Numerologies>

The present invention proposes an embodiment of a position of a DMRS in a data transmission region in a subframe when OFDM symbols having different numerologies are included in an in-band of 5th generation NR.

1. Embodiment 1-1

When a subframe is configured based on specific subcarrier spacing and a DMRS is commonly included in a data region of the corresponding subframe, but there is a plurality of OFDM symbols with different lengths, positions of the OFDM symbols may be equalized with each other.

For example, when one subframe is configured with 14 OFDM symbols of subcarrier spacing of 15 kHz and the 14 OFDM symbols have Symbol Index_1 of 0 to 13, respectively, it may be assumed that 28 OFDM symbols with subcarrier spacing of 30 kHz are positioned in one subframe and have Symbol index_2 of 0 to 27, respectively. Then, when a DMRS is positioned in Symbol Index_1=2, the DMRS may be positioned in Symbol Index_2=4 or 5.

2. Embodiment 1-2

When a subframe is configured based on specific subcarrier spacing and OFDM symbols with different lengths are deployed in a data region of the corresponding subframe, a position of a first DMRS of an OFDM symbol having specific subcarrier spacing and a time position of a first DMRS of an OFDM symbol having a smaller length than the specific subcarrier spacing may be equalized with each other.

3. Embodiment 1-3

When the number of OFDM symbols including a basic DMRS of an OFDM symbol having specific subcarrier spacing is N, the number of basic DMRSs of an OFDM symbol having a smaller length than the specific subcarrier spacing may be greater than N. That is, the number of OFDM symbols including a basic DMRS may be proportional to subcarrier spacing. For example, when the number of OFDM symbols including a basic DMRS is one in an OFDM symbol with subcarrier spacing of 15 kHz, the number of OFDM symbols including the basic DMRS may be two in an OFDM symbol with subcarrier spacing of 30 kHz.

4. Embodiment 1-4

When a short OFDM symbol is transmitted in a subframe configured with an OFDM symbol having specific subcarrier spacing and a plurality of short OFDM symbols including a basic DMRS are present, a quotient obtained by dividing the number of short OFDM symbols used as data by the number of short OFDM symbols including a basic DMRS may be used as an interval between basic DMRS OFDM symbols.

For example, when 20 OFDM symbols are used as data and the number of basic DMRS OFDM symbols is 2, a quotient obtained by dividing 20 by 2, that is, 10 is an interval between the basic DMRS OFDM symbols, and a first basic DMRS is positioned in Symbol Index_2=4, a second basic DMRS may be positioned in Symbol Index_2=14.

5. Embodiment 1-5

Figure 18:
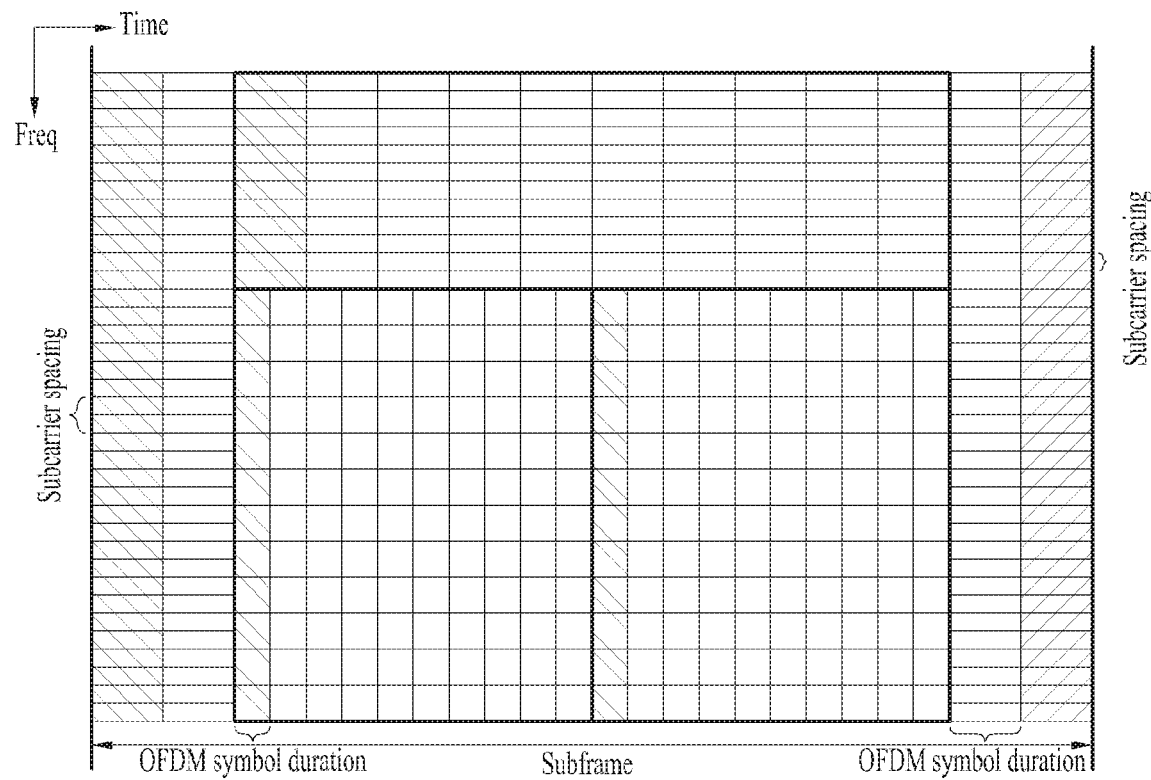
FIGS. 18 to 19 are diagrams for explanation of an embodiment for multiplexing OFDM symbols with different lengths.

As seen from FIG. 18, when a short OFDM symbol is transmitted in a subframe configured with an OFDM symbol having specific subcarrier spacing, a mini-subframe configured with a short OFDM symbol may be defined and the mini-subframe may be included in the subframe configured with the OFDM symbol having the specific subcarrier spacing. In this case, at least one basic DMRS OFDM symbol may be included in the mini-subframe and, when a plurality of mini-subframes having different OFDM symbol lengths are present, start parts of the mini-subframes may be positioned to be matched with each other.

6. Embodiment 1-6

Figure 19:
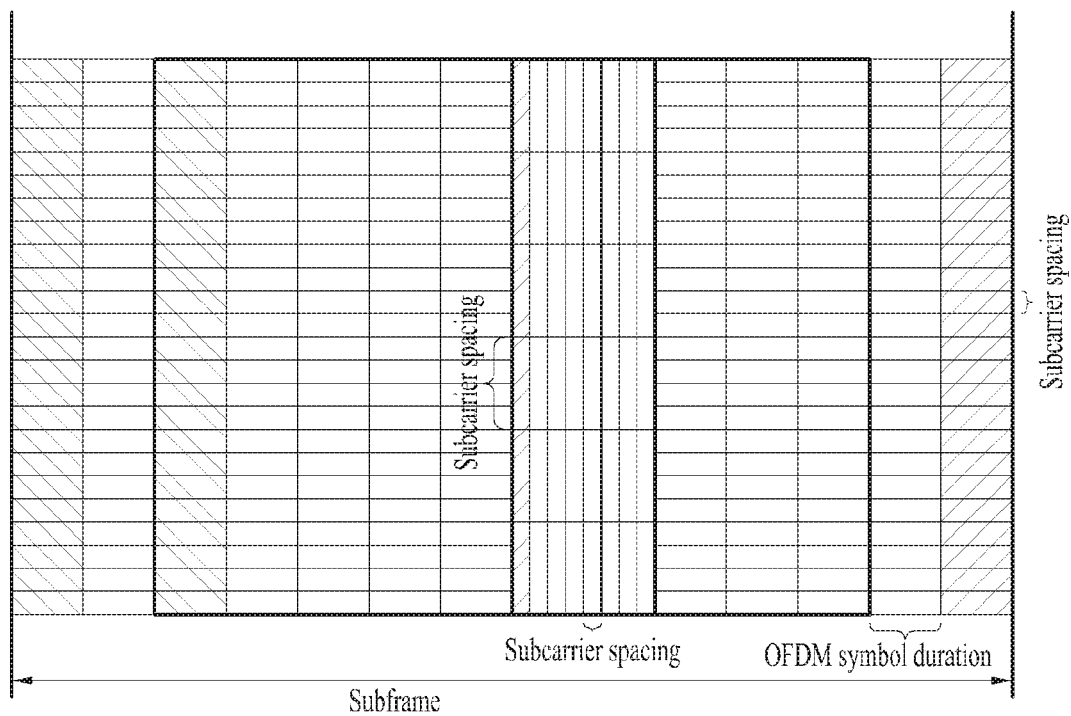

Referring to FIG. 19, when OFDM symbols having different lengths are TDMed and a mini-subframe is configured with a plurality of short consecutive OFDM symbols, a DMRS may be positioned in a start OFDM symbol of the mini-subframe.

Hereinafter, an embodiment of a sequence that can be used in a DMRS when different numerologies are used in an in-band will be described.

1. Embodiment 2-1

Figure 20:
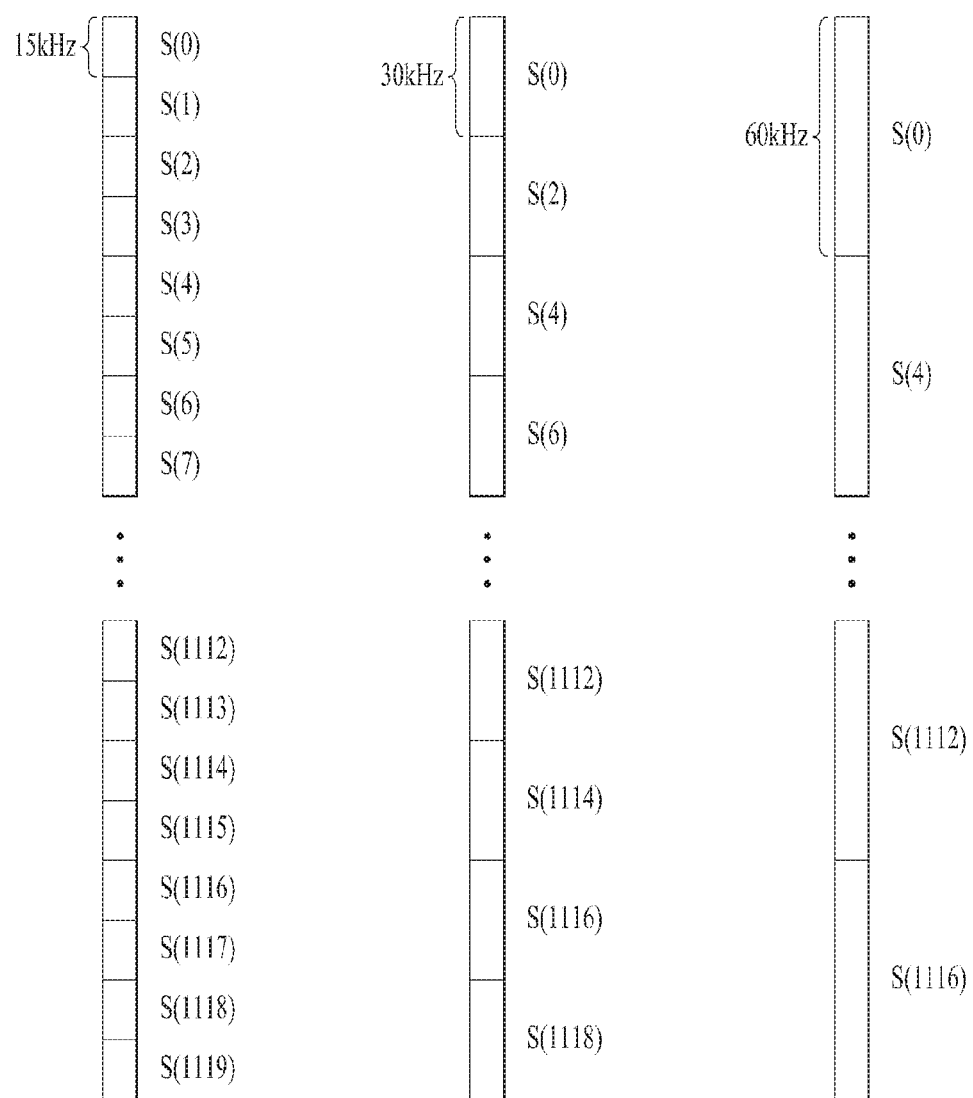
FIG. 20 is a diagram for explanation of an example of configuring REs in one symbol according to subcarrier spacing.

Referring to FIG. 20, when a specific cell wants multiple numerology, a sequence mapped to a DMRS RE may be generated based on smallest subcarrier spacing and, when a numerology is changed, a subsequence of the generated sequence may be used.

For example, when a smallest value of subcarrier spacing supported by a specific cell is N and subcarrier spacing increases by $2^M$ times, subcarrier spacing $SC=N\times2^M$ may be expressed. Here, N=15 kHz where M=0, 1, 2, 3 and SC=15 kHz, 30 kHz, 60 kHz, and 120 kHz. In detail, when smallest subcarrier spacing supported in a band of 20 MHz is 15 kHz and 1200 REs are present in the band, if 24 REs configure 1 RB, 50 RBs may be made. Similarly, when subcarrier spacing is 30 kHz and 600 REs are present, 25 RBs may be made, when subcarrier spacing is 60 kHz and 300 REs are present, 12 to 13 RBs may be made, and when subcarrier spacing is 120 KHz and 150 REs are present, 6 to 7 RBs may be made.

When different sequences are mapped to an RS, 1200, 600, 300, and 150 sequence values may be required in 15 kHz, 30 kHz, 60 kHz, and 120 kHz, respectively, according to each numerology. When a sequence having 1200-length based on 15 kHz that is smallest subcarrier spacing, a sequence may be generated via sub-sampling of the 1200-length sequence in different subcarrier spacing used in an in-band and, in this regard, 600 samples may be used via sub-sampling at two spacing in 30 kHz, 300 samples may be used via sub-sampling at four spacing in 60 kHz, and 150 samples may be used via sub-sampling at eight spacing in 120 kHz.

2. Embodiment 2-2

When a plurality of OFDM symbols having long subcarrier spacing are used as an RS in an OFDM symbol section having short subcarrier spacing, the same base sequence may be used in the plurality of OFDM symbols. In this case, the base sequence may use a sub-sampled sequence column among sequence columns generated based on smallest numerology.

3. Embodiment 2-3

Like a DMRS-ID, a new ID applied to a DMRS may be defined and used as a seed value of a sequence and the DMRS-ID and the Cell-ID may not be the same.

An eNB may notify a UE about a DMRS-ID value used in a DMRS for data decoding and may additionally notify the UE about a DMRS-ID of an interference channel to estimate a channel of an adjacent link, adjacent cell, or TPR.

<DMRS Deployment for Support of Multiple User>

In a 5$^{th}$ NR, one slot may be configured using 7 OFDM symbols or 14 OFDM symbols. When a slot is configured using fewer OFDM symbols than 7 or 14 OFDM symbols, the slot may be defined as a mini-slot. The mini-slot may advantageously transmit data at high speed in a short time period. On the other hand, when a too small time period is defined as a mini-slot, RS overhead may be disadvantageously increased compared with a time period for transmitting data.

To overcome this, DMRS sharing between multiple mini-slots may be considered. This may be similar to a method of deploying a DMRS in a fourth OFDM symbol in a slot configured with 7 OFDM symbols in LTE UL and sharing the DMRS between a user using OFDM symbols #1, #2, and #3 and a user using OFDM symbols #5, #6, and #7 based on the DMRS. However, in NR, a position of the mini-slot, to which the DMRS is mapped, may not be determined and, particularly, when analog beamforming is performed every mini-slot, a channel is changed due to analog beamforming and, thus, it may be difficult to share the DMRS with an adjacent mini-slot. Accordingly, a method of determining a mini-slot with which the DMRS is to be shared may be considered.

In this case, a DMRS may be transmitted in a specific mini-slot but may not be transmitted in another mini-slot. In addition, the DMRS may be transmitted through an OFDM symbol positioned at a rear end of an OFDM symbol in which data is transmitted, in a mini-slot determined to share the DMRS, and the DMRS may be shared with a mini-slot transmitted after the mini-slot determined to share the DMRS is transmitted. However, in the mini-slot transmitted after the mini-slot determined to share the DMRS is transmitted, the DMRS may not be transmitted.

When a DMRS may not be transmitted in a min slot positioned at a front part and may be transmitted in the mini-slot transmitted after the mini-slot positioned at the front part is transmitted, the DMRS may be transmitted through an OFDM symbol positioned at a front part among OFDM symbols in which data is transmitted in a mini-slot transmitted later.

Lastly, a method of differently configuring DMRS transmission positions between continuously transmitted mini-slots may be considered. For example, in the case of an early transmitted mini-slot, a DMRS may be transmitted through an OFDM symbol positioned at a rear part among OFDM symbols in which data is transmitted and, in the case of a later transmitted mini-slot, the DMRS may be transmitted through an OFDM symbol positioned at a front part among the OFDM symbols in which data is transmitted. In detail, an orthogonal cover code (OCC) may be applied to each DMRS included in consecutively transmitted mini-slots.

<Port Assignment and Power Allocation>

An LTE UL DMRS may be designed to transmit all DMRS ports to 12 REs included in 1 RB and to transmit the DMRS ports with the same transmission power. On the other hand, an LTE-A DL DMRS may be transmitted using specific 12 REs up to rank-2, and 12 REs may be additionally allocated and transmitted in rank-3 or more and, in this case, ports #1 and #2 may be transmitted in the same group and port #3 may be transmitted in a different group. Here, port #3 may have higher transmission power than ports #1 and #2 but, despite this, the LTE-A DL DMRS may be designed to be configured to have the same DMRS transmission power for ports #1, #2, and #3.

Similarly, when all multiple DMRS ports are supported in a group including a plurality of REs in NR DMRS design, transmission power values of the respective DMRS ports may be uniformly configured according to the number of transmission layers. For example, in the case of rank-2, ½ of entire power may be allocated to each port and, in the case of rank-3, ⅓ of entire power may be allocated to each port.

When a plurality of groups including a plurality of REs are present in DMRS design, if the number of the groups is linearly increased as a transmission rank increases, transmission power values may be allocated to the respective groups. On the other hand, when a DMRS port is transmitted in a specific group up to a predetermined rank, if a group is additionally allocated when a current range exceeds the predetermined rank, there may be a problem in that transmission power of DMRS ports transmitted in the respective groups is not constant. To overcome this problem, a method of equalizing transmission power of respective transmission DMRS ports may be introduced.

<DMRS Design and Indicator for Simultaneously Supporting CP-OFDM and DFT-S-OFDM Waveform>

In an OFDM system, a time and frequency-specific subcarrier may be allocated to a DMRS. According to the characteristics of an OFDM-based waveform, multiplexing methods of an RS and a data channel may be different and, in a CP-OFDM based system, a data signal, a DMRS, and the like may be multiplexed and transmitted in one OFDM symbol and, on the other hand, in a system using DFT-S-OFDM with low PAPR/CM characteristics of a transmission signal, a data signal, a DMRS, and the like may be transmitted in units of OFDM symbols.

For example, an LTE DL system may be designed based on CP-OFDM and, in this regard, various RSs such as CRS, CSI-RS, and DMRS may be multiplexed and transmitted with a data signal, a control signal, or the like, in units of frequencies in one OFDM symbol. An LTE UL system may be designed based on DFT-S-OFDM and, in this regard, a data signal, a control signal, or a DMRS may be transmitted in units of OFDM symbols to maintain low PAPR/CM characteristics in each transmission time point.

In 5$^{th}$ generation NR, DL, UL, and sidelink may be designed based on a CP-OFDM waveform. However, in UL, DFT-S-OFDM wave may be used in the case of a single layer of Rank 1 to ensure coverage of a UE.

Like DL/UL/sidelink, etc., when all links use the CP-OFDM waveform in the same way, the DMRS may be deployed in units of time/frequency according to the characteristics of the CP-OFDM waveform. However, in UL, the CP-OFDM waveform and the DFT-S-OFDM waveform may be simultaneously used and multiple user signals with different waveforms may be received and, in this regard, when channel estimating devices need to be separately designed according to the respective waveforms during demodulation of the received signals, complexity of a receiver may be increased. Accordingly, there is a need to design a DMRS, a channel of which can be estimated by a common receiver that is appropriate for the characteristics of the CP-OFDM waveform and the DFT-S-OFDM waveform.

1. Embodiment 1

DMRS patterns used in a CP-OFDM and a DFT-S-OFDM may be designed to be the same. A channel estimating device may use different operating methods depending on a DMRS pattern and, thus, when the DMRS patterns are the same, the same channel estimating device may be used. An interleaved type RS pattern may be considered as a DMRS pattern used in the CP-OFDM and the DFT-S-OFDM. For example, an RS may be deployed in N subcarriers spaced apart from each other at an equivalent interval among subcarriers in an OFDM symbol. In detail, when the equivalent interval is an interval 2, a corresponding subcarrier may correspond to an even or odd number and, when 12 REs are grouped to configure 1 RB, RSs may be deployed at intervals 2, 3, 4, 6, etc. In this case, a waveform may be advantageously maintained in a low PAPR.

Here, in the case of the CP-OFDM waveform, data may be transmitted through subcarriers positioned between subcarriers in which an RS is deployed and, on the other hand, in the case of DFT-S-OFDM waveform, a signal may be transmitted only to a subcarrier of a DMRS and other subcarriers may be allocated to a null RE (i.e., reserved RE) without a transmitted signal therethrough, in an OFDM symbol in which the DMRS is transmitted.

In the case of the CP-OFDM waveform, when low Rank is transmitted like Rand 1 or Rank 2, an indicator indicating whether data is transmitted through an RE except for an RE for a DMRS or the RE except for the RE for the DMRS is reserved as the Null RE may be configured in an OFDM symbol including the DMRS.

Here, the indicator indicating whether the RE except for the RE for the DMRS is used as the null RE may indicate the number of DMRS CDM groups without data.

On the other hand, in the case of the DFT-S-OFDM waveform, in the OFDM symbol including the DMRS, the RE except for the RE allocated to the DMRS may be considered as the null RE and may not transmit a signal.

In both the CP-OFDM waveform and the DFT-S-OFDM waveform, an indicator indicating a position of a RE to be used as a DMRS may be configured. For example, when N subcarriers spaced apart from each other at an equivalent interval are grouped as one group, N groups may be formed and, in this case, the indicator may indicate a group used as an RS among the N groups. In particular, in UL, an eNB may indicate a position of an RE for an RS using the indicator and, according to a waveform, whether the RE except for the RE for the RS is used to transmit data or is transmitted as the null RE may be indicated in one symbol. A UE that receives the indicator may perform RS transmission and data transmissions based on the indicator.

According to each waveform, a sequence used in an RS may be differently applied. For example, in the case of a CP-OFDM, a PN sequence may be used and, in the case of a DFT-S-OFDM, a sequence with low PAPR may be used like a Zadoff-Chu sequence.

When frequency positions of RSs using different sequences are equalized, a scrambling sequence of an RS is changed and, thus, it is difficult to distinguish between signals at a receiving end. Accordingly, when different types of sequences are used as a scrambling sequence, it may be desirable to deploy RSs at different positions. When different scrambling sequences are used at the same position like a PN sequence and a ZC sequence, an RS may be transmitted through a multiple OFDM symbol on the time domain and an orthogonal cover code (OCC) may be applied on the time domain.

The aforementioned embodiment has been described to be limited to UL but may be applied to DL. The CP-OFDM waveform may be used in DL and, thus, there may be no problem that arises when different waveforms are used.

However, in consideration of DMRS overhead during lower rank transmission, when some REs in an OFDM symbol are used as an RS, an indicator indicating whether the remaining REs are used to transmit data or are reserved as the null RE may be required.

In a dynamic TDD system, different link directions may be configured between adjacent transport points (TPs) and, in this case, for the purpose of removing interference of an adjacent TP, a specific RE may be empty, that is, the specific RE may be allocated to the null RE or a reserved RE to estimate a channel of the adjacent TP. Thus, effective transmission may be obtained when an indicator indicating whether an RE except for a DMRS is used to transmit data or is reserved as a null RE in an OFDM symbol including the DMRS is also present in DL.

<Phase Tracking Reference Signal (PTRS)>

A high modulation order such as 64 QAM in a band around 30 GHz is sensitive to phase noise and, thus, there is a need for phase tracking reference signal (PTRS).

The PTRS may be used to estimate residual frequency offset as well as to estimate a common phase by phase noise.

Common phase error is changed every OFDM symbol and, thus, an RS needs to be transmitted every OFDM symbol to estimate the common phase error. On the other hand, frequency offset is changed according to specific tendency and, thus, RSs may be transmitted in units of N OFDM symbols to estimate the frequency offset and the frequency offset may be estimated.

A width of variation of common phase error is not high and, thus, only when common phase error has complex constellation like 64 QAM, sensitivity of the error may be recognized and, on the other hand, variation of the frequency offset exceeds $2\pi$ and, thus, the sensitivity of the error may be recognized even in a low modulation order like QPSK or the like.

In the other words, an RS for estimating common phase error may be required in the case of a high modulation order in a high frequency band and an RS for estimating frequency offset may be required irrespective of a band and a modulation order. Accordingly, PTRS for frequency offset estimation may be transmitted every slot and, as necessary, PTRS for estimation of the common phase error may be additionally transmitted.

According to the present invention, for convenience of description, an RS transmitted for frequency offset estimation or timing tracking may be referred to as a basic PTRS or a basic TRS.

Timing when frequency offset and signal are reached may be changed according to a transport point or analog beamforming.

In DL transmission, an eNB may determine a time unit for estimating frequency offset and timing to a UE. For example, the basic TRS may be included in a time slot in which a synchronization signal is transmitted. In this case, when there is an index indicating a synchronization signal block configured with a predetermined number of OFDM symbols for transmitting a synchronization signal, frequency offset and timing tracking information estimated in a corresponding synchronization signal (SS) block may be associated with an SS block index.

When an RS, a measurement RS, a beam tracking RS, or other information items for demodulation of PBCH or PBCH is associated with beam sweeping, frequency offset and timing tracking information may be associated with the SS block index. In the case of a single beam without beam sweeping, an RS using the estimated frequency offset and timing tracking information may be determined.

An eNB may determine a time unit in which the estimated information is available. In this case, the estimated information or information on the time unit in which the estimated information is available may include an indicator indicating whether the estimated information is available in control information for receiving specific data.

For example, when the SS block index is included in the estimated information or information on the time unit in which the estimated information is available, it may be assumed that the frequency offset and timing information estimated in the corresponding SS block can be applied or resource information of an RS, etc. may be indicated through the estimated information or information on the time unit in which the estimated information is available. In addition, an order of RS resources may be predetermined and may be indicated.

An RS used for frequency offset and/or timing tracking may be defined as a subset of PTRS. For example, a specific port of the PTRS may be defined as basic PTRS and a pattern with low time or frequency density may also be used among patterns of the PTRS as the basic PTRS.

<PTRS for Simultaneously Supporting CP-OFDM and DFT-S-OFDM Waveform>

Inter carrier interference, common phase error, and so on may be seriously generated by phase noise in a band of 30 GHz or greater to degrade performance in a modulation order of 64 QAM or greater. As a method for overcoming this, subcarrier spacing may be widened to reduce sensitivity with respect to ICI or a phase varied every OFDM symbol may be estimated to reversely compensate for the phase.

In LTE, subcarrier spacing of 15 kHz may be used and, on the other hand, subcarrier spacing of 60 kHz or greater may be considered to operate NR in a band around 30 GHz. In addition, an RS for tracking a phase varied every OFDM symbol may be introduced to estimate a phase and, during demodulation of a signal, a phase may be corrected by the estimated phase.

According to the present invention, an RS for phase tracking is referred to as PTRS. The PTRS may be transmitted every OFDM symbol or every N OFDM symbols.

That is, the PTRS is transmitted in the same subcarrier position in each OFDM symbol to measure a degree by which a phase is varied for each subcarrier. In addition, M specific REs may be used in a RB or a resource block group for PTRS transmission and, in this regard, PTRSs may be grouped and transmitted in a cluster type in a specific RB or a resource block group, may be transmitted in an interleaving type at an equivalent interval, or may be transmitted irrespective of an interval.

In a system using a CP-OFDM waveform, estimation performance may be determined according to a deployment type of tracking RSs (TRSs) but, in a system using a DFT-S-OFDM waveform, it may be desirable to determine RS deployment in a direction in which PAPR is not damaged during TRS deployment.

In a system using a DFT-S-OFDM waveform, the PTRS may be positioned in a specific RE in an OFDM symbol in which data is transmitted. In this case, it may be desirable to deploy PTRSs at an equivalent interval. It may be desirable to use a Zadoff-chu (ZC) sequence as a sequence for the PTRS. In this case, lengths of ZC sequences may be adjusted according to the number of PTRSs used in one OFDM symbol or a ZC sequence used in the DMRS may be reused.

When the ZC sequence is reused, if elements corresponding to the number of PTRSs are selected from a DMRS ZC sequence column, it may be desirable to select elements, indexes of which have as equivalent as possible interval among values between first and end elements. For example, when six elements are selected in a DMRS sequence with 36-length, 6 elements may be selected at an interval 6.

For example, low PAPR may be maintained when a sequence such as ($\{1, 7, 13, 19, 25, 31\}$+offset (offset=$\{0, 1,2,3,4,5\}$)) is selected and PTRS is transmitted.

In addition, a DFT spreading unit of data may be the number of REs used for data transmission. For example, when 6 RBs are allocated, 72 may be the DFT spreading unit (in LTE, $N=2^a 3^b 5^c$).

In this case, the DFT spreading unit in an OFDM symbol including a PTRS may be defined as the number of the remaining REs except for the number of PTRSs. Here, $N=2^a 3^b 5^c$-M where M is the number of PTRSs included in one OFDM symbol.

Like in legacy LTE, to maintain the DFT spreading unit as $N=2^a 3^b 5^c$, it may be desirable to define N-M within $2^d 3^e 5^f$ where M is the number of PTRSs included in one OFDM symbol. For example, when 8 RBs are used and PTRS uses two REs every 1 RB in data transmission, DFT spreading may be maintained in a relationship of the product of an order of 2, 3, 5 of the legacy LTE according to $8 \times (12-2) = 8 \times 10$.

<Channel Estimation Unit: PRB Bundling/RE Bundling/Slot Bundling/Symbol Bundling>

A weight of a transmission beam may be changed in units of RBs in DL DMRS-based transmission of LTE-A and, when a receiving end estimates a channel from a DL DMRS, a PRB bundling concept of determining whether the channel is estimated in units of single RB or in units of a plurality of RBs may be applied.

When a DL DMRS of LTE-A introduces a 2D-MMSE-based channel estimation scheme, an RS pattern for acquisition of optimum channel estimation performance may be designed and, in this regard, in the 2D-MMSE-based channel estimation scheme, there is a problem in that complexity in terms of estimation is seriously increased as a PRB bundling size increases.

In LTE-A DL, a bundling size is permitted to a maximum of 2 RBs or 3 RBs depending on a system band. On the other hand, when it is assumed that a frequency equalization weight is applied in LTE UL and it is simultaneously assumed that the same value as a transmission weight applied to a DMRS is applied to transport resource blocks even when channel estimation is performed with a UL DMRS, the channel may be estimated.

An LTE UL DMRS may use all REs of one OFDM symbol and may enable FFT-based channel estimation having optimum performance in 1 D and, in this case, even if RB bundling with a large size is applied, channel estimation may be advantageously performed.

To apply frequency-selective precoding in a frequency-selective channel to enhance beamforming performance, it may be desirable to narrow an RB bundling size. To simultaneously accommodate a plurality of users, it may be desirable to perform frequency-selective precoding even when MU-MIMO pairing is used as a RB unit.

When a pattern is designed to transmit a DMRS of 5G NR in all OFDM symbols of a single OFDM symbol like LTE UL DMRS or to transmit positions of REs with an equivalent interval among REs included in a single OFDM symbol using an RS similarly to LTE DL CRS, the receiving end may use an FFT-based channel estimation scheme as well as 2D MMSE.

A small cell, indoor, or the like may be considered as main deployment scenario 5G NR. In particular, considering that a coherence band of a radio channel is increased when analog beamforming is introduced, it may be desirable to use the same precoding weight in a frequency band at a predetermined level rather than applying ultimate frequency-selective precoding.

That is, in NR, it may be desirable to apply a higher value to RB bundling size than 2 RBs or 3 RBs of LTE-A DL. A unit of RB bundling may be a consecutive resource unit of an allocated frequency resource.

On the other hand, LTE-A DL DMRS and UL DMRS may be assumed to apply the same weight to a PRB to estimate a channel. On the other hand, in NR DMRS, an RE group or an OFDM symbol group unit, or a frequency axis and/or time axis bundling combination may be considered. The RE group or the OFDM symbol group unit may facilitate beam cycling or beam sweeping.

In particular, assuming that a plurality of OFDM symbols are present in a slot in which data is transmitted and a channel estimated from a DMRS included in a specific OFDM symbol is applicable to a corresponding OFDM symbol, an adjacent OFDM symbol group, or specific OFDM symbols present in a slot, when sweeping is performed on analog and/or digital beam in units of OFDM symbols or OFDM symbol groups in a slot, beam diversity may be expected.

Similarly, assuming that a channel estimated from a DMRS positioned in a specific RE in a RB to a corresponding RE, an adjacent RE group, REs in a RB, or an RE in the RB group, beam diversity in which a digital beam is changed in the RB or the RB group may be expected.

RB bundling in DL may be assumed to be a channel estimation unit of a UE. On the other hand, RB bundling in UL may be assumed to a unit in which a precoder is applied. That is, in UL transmission, the UE may receive information on an RB size to which the precoder is applied from an eNB and, accordingly, precoding may be applied. In this case, the RB size may be determined in units of RBs, RB groups, or entire allocated bands.

<Design Criteria>

Maximum spectral efficiency demanded in an NR system is 30 bps/Hz (DL) or 15 bps/Hz (UL) which is the same as spectral efficiency of 3GPP LTE-A. In LTE-A, modulation of 64 QAM, 8 transmission layers in DL and 4 transmission layers in UL, and requirement of 30 bps/Hz (DL) and 15 bps/Hz (UL) have been accomplished.

Likewise, upon considering spectral efficiency requirement in an NR system, it is desirable that a maximum number of transmission layers be 8 in DL and 4 in UL. While the number of eNB antennas increases, the number of antenna ports may increase and it is assumed that a maximum value of a layer that can be transmitted by the eNB is 16. In addition, it is also assumed that a maximum layer that can be received by the eNB is 16.

That is, the number of layers for transmission and reception required by an NR system is as follows.

Assumption of the number of point-to-point transmission layers

SU transmission: maximum 8 (DL) and maximum 4 (UL),

MU transmission: maximum 4 (DL) and maximum 4 (UL)

Assumption of a maximum number of layers for eNB transmission/reception

Maximum 16 (DL) and 8 (UL)

In this design, an NR DMRS is designed under the following assumption.

A maximum of 8 APs is supported per UE.

A maximum of 16 APs that can perform simultaneous transmission is supported.

Resources are configured to distinguish between a maximum of 8 APs on one OFDM symbol.

A minimum of energy of 2 REs or 3 REs is included in each an AP.

This means that 2 REs per AP are used when 16 REs are used for 8 APs and that 3 REs per AP are used when 24 REs are used for 8 APs. In this design, it is assumed that a resource block includes 16 REs or 24 REs which are a multiple of 8.

<Method of Multiplexing on Single OFDM Symbol>

A method of multiplexing a plurality of APs on one OFDM symbol includes an FDM method using different frequency resources per AP and a CDM method using separate code resources on the same resource.

Figure 21:
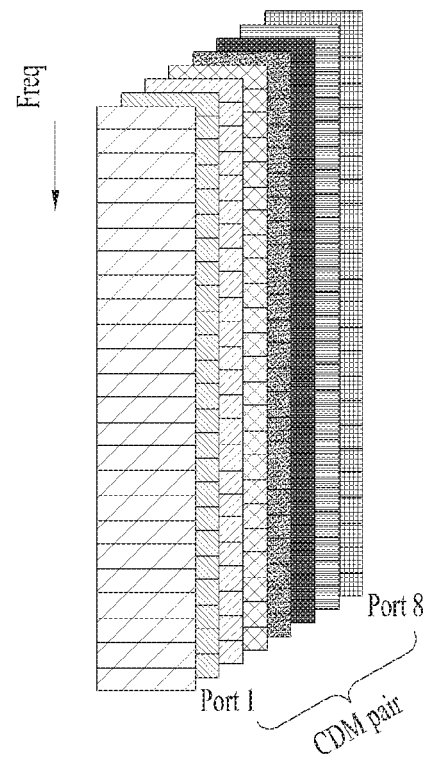
FIG. 21 is a diagram for explanation of a method of spreading a DMRS to N REs via CDM and transmitting the DMRS using eight orthogonal code according to an embodiment of the present invention.

FIG. 21 is a diagram for explanation of a method of spreading a DMRS using a CDM method in N REs and transmitting the DMRS using 8 orthogonal codes according to an embodiment of the present invention.

That is, FIG. 21 illustrates a method of sharing a length-N scrambling sequence (e.g., a PN sequence, CAZAC, etc.) used in an allocated band by all APs and allocating 8 length-N orthogonal sequences (e.g., DFT or Hadamard) to the APs, as an example of using orthogonal codes on N REs.

Figure 22:
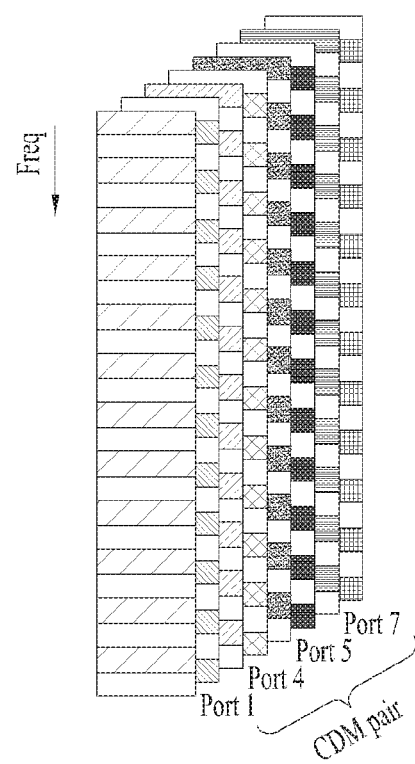
FIG. 22 is a diagram for explanation of a method using a combination of FDM and CDM according to an embodiment of the present invention.

FIG. 22 is a diagram for explanation of a method using a combination of FUM and CDM according to an embodiment of the present invention.

FIG. 22 also illustrates a method of dividing N REs into N/2 REs according to an even number and an odd number and using orthogonal codes for distinguishing between 4 APs in each group, as an example of using frequency resources and orthogonal codes on N REs. In a length-N scrambling sequence (e.g., a PN sequence, CAZAC, etc.) used in an allocated band, two subset sequences may be used according to an even number index and an odd number index and each subset sequence may be shared by APs. 4 length-N/2 orthogonal sequences (e.g., DFT or Hadamard) are allocated to APs.

A length-N/2 scrambling sequence used in an allocated band may be equally used on two frequency resources and 4 length-N/2 orthogonal sequences may be allocated to APs.

Figure 23:
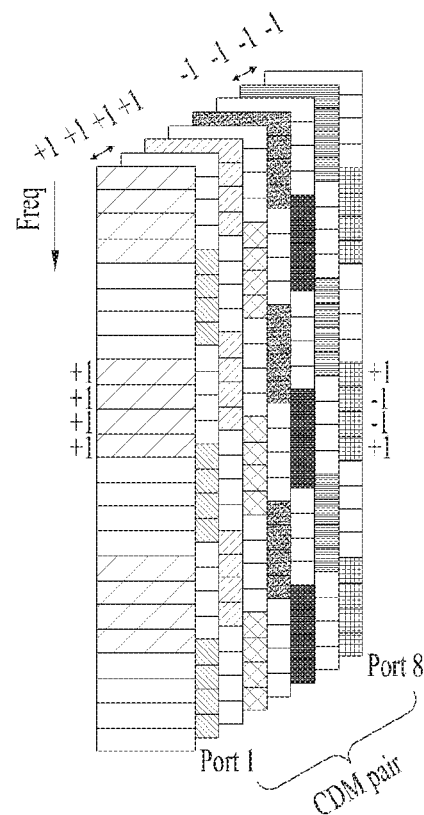
FIG. 23 is a diagram for explanation of a method using a combination of FDM and OCC according to an embodiment of the present invention.

FIG. 23 is a diagram for explanation of a method using a combination of FUM and OCC according to an embodiment of the present invention.

As an example of using frequency resources and orthogonal codes on N REs, 4 consecutive frequency resource groups are formed and 4 orthogonal code resources are allocated to 4 APs in the frequency resource groups. In other words, another frequency resource group may be formed on 4 continuous REs and 4 orthogonal code resources may be allocated to 4 different APs.

When N REs are used per RB, a total of N/4 resource groups having 4 contiguous frequencies may be formed and resource groups separated at an interval of 4 REs may be used by 4 APs. Length-N/4 scrambling sequences defined in a corresponding RB may be used in N/4 frequency groups, respectively.

Figure 24:
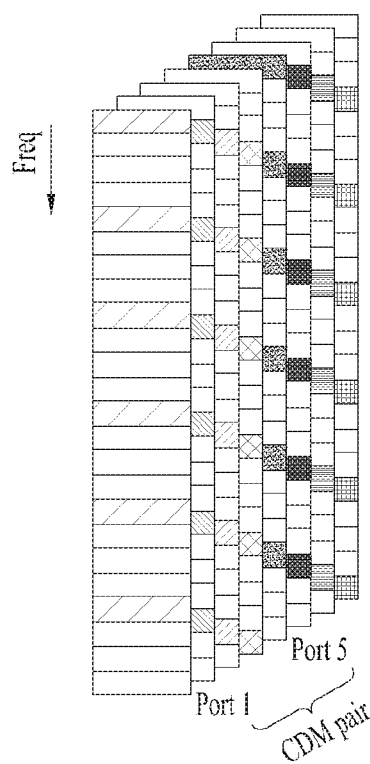
FIG. 24 is a diagram for explanation of a method using a combination of FDM and CDM according to another embodiment of the present invention.

FIG. 24 is a diagram for explanation of a method using a combination of FUM and CDM according to another embodiment of the present invention.

A total of 4 frequency resource groups may be generated by using resources having an interval of 4 REs as a frequency group and each of the 4 frequency resource groups distinguishes between 2 APs by orthogonal resource.

A length-N scrambling sequence defined in a corresponding RB may be mapped to every RE and different scrambling sequences may be mapped to frequency resource groups. OCC-2 ([+1+1], [+1−1]) may be used as two orthogonal resources.

A length-N/4 scrambling sequence defined in a corresponding RB is mapped to an RE belonging to a frequency resource group and frequency resource groups may use the same scrambling sequence as a base sequence. A special offset sequence may be introduced to frequency resource groups. OCC-2 ([+1+1], [+1−1]) may be used as two orthogonal resources.

Figure 25:
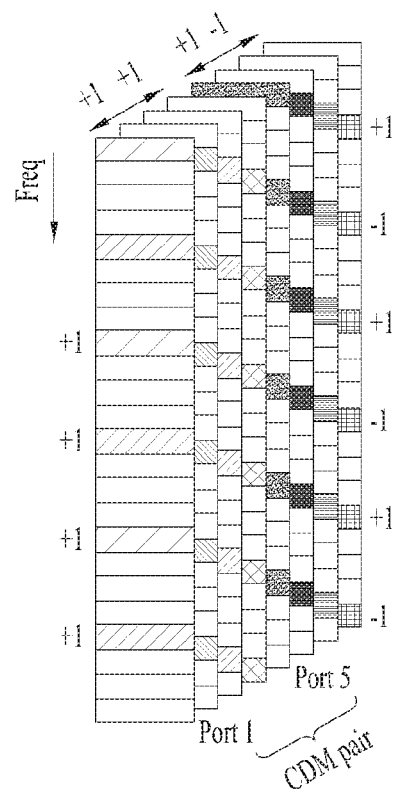
FIGS. 25 and 26 are diagrams for explanation of a method using a combination of FDM and OCC according to another embodiment of the present invention.
Figure 26:
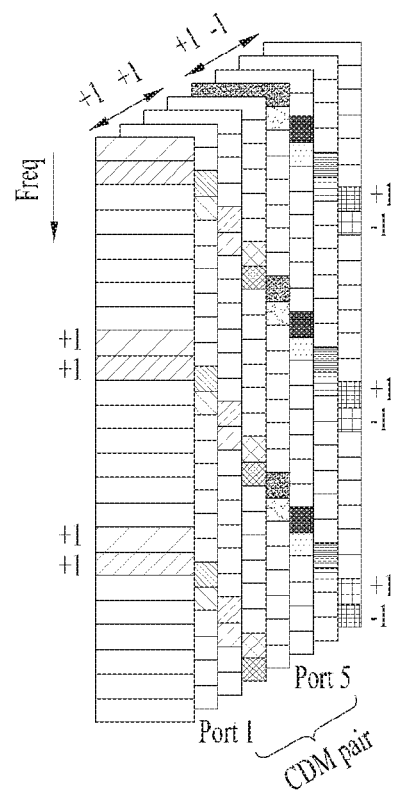

FIGS. 25 and 26 are diagrams for explanation of a method using a combination of FDM and OCC according to another embodiment of the present invention.

In FIG. 25, a total of 4 frequency resource groups may be generated using resources having an interval of 4 REs and each of 4 resource groups may distinguish between 2 APs by orthogonal resources.

In FIG. 26, two contiguous REs may be used as a unit applied to OCC and 4 OCC groups may be generated on 8REs. A length-N/2 scrambling sequence defined in a corresponding RB may be mapped to each OCC group.

Figures 27, 28:
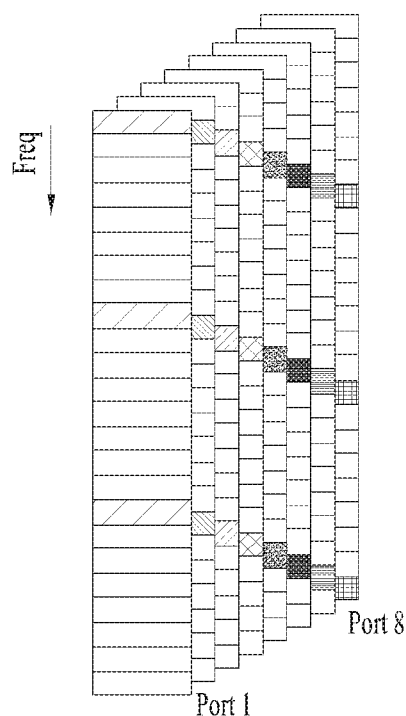
FIG. 27 is a diagram for explanation of an interval of 8 REs per AP using FDM according to another embodiment of the present invention.
FIG. 28 is a diagram showing a method of applying FDM and CDM according to an embodiment of the present invention.

FIG. 27 is a diagram for explanation of an FDM method using an interval of 8REs per AP according to another embodiment of the present invention.

According to the embodiment of FIG. 27, the number of REs per port may be fixed irrespective of the number of layers. For example, the number of REs per port may be fixed to "N-RE/maximum number of APs". The number of REs may be variable according to the number of layers. For example, The number of REs may be variable according to 1) single layer: 24 REs per port, 2) 2-layer: 12 REs per port, 3) 3-layer: 8REs per port, 4) 4-layer: 6REs per port, 5) 6-layer: 4REs per port, 6) 8-layer: 3REs per port, and so on.

In addition, in the case of 5-layer, 5 ports may be used in a DMRS pattern for 6-layer and, in the case of 7-layer, 7 ports may be used in a DMRS pattern for 8-layer.

While the above methods have described a DMRS resource allocation method for a maximum of 8 APs, the above method may be used as a resource allocation method for less APs than 8 APs. For example, assuming that a maximum of 4 APs are present, a subset of the above method may be used. When APs are extended to a maximum of 8 APs, one OFDM symbol may be further used. For example, APs may be distinguished by applying OCC-2 to two OFDM symbols. The following table assumes that 8 APs and 24 REs in LTE-A.

TABLE 1

| | Number of APs | | | | | | | |
|---|---|---|---|---|---|---|---|---|
| | 1 | 2 | 3 | 4 | 5 | 6 | 7 | 8 |
| RE/AP | 12 | 6, 6 | 6, 6, 12 | 6, 6, 6 | 6, 6, 6, 3, 3, 6 | 3, 3, 3, 6 3 | 3, 3, 3, 3 3 3 | 3, 3, 3, 3, 3, 3 3 |

<Sequence for CDM>

In the case of a legacy LTE UL DMRS, a ZC sequence may be used as a base sequence. In addition, to apply a time domain cyclic shift, DFT vector $\exp(j*2*pi*n*k/12)$ with an interval 12 may be used and eight vectors among 12 orthogonal vectors may be used and, in this case, the use of the vector may be repeatedly applied in units of 12 REs.

In a new system, a method of applying CDM or OCC to a frequency axis may be considered as a method of multiplexing eight orthogonal DMRS APs in one OFDM symbol may be considered.

1. Embodiment 2-1

When the time domain cyclic shift is applied, DFT vector $\exp(j*2*pi*n*k/8)$ with an interval 8 may be used. Accordingly, impulse response with respect to respective radio channels of eight layers may advantageously space the layers in the time domain apart from each other by a maximum interval. In particular, the present embodiment may be applied to a pattern using 8 orthogonal DMRS APs via CDM. In this case, Hadamad-8 may be applied as the orthogonal sequence.

In this case, when 12 REs are defined as 1 RB, if a vector with a length of 8 is deployed in an RE, a vector of one cycle and a portion of the vector may be mapped to each other. For example, when the vector with a length of 8 is $[S_n(0)\ S_n(1)\ S_n(2)\ S_n(3)\ S_n(4)\ S_n(5)\ S_n(6)\ S_n(7)]$, the mapping may be performed as follows in consideration of an order for mapping of 12 REs.

12RE Mapping: $[S_n(0)\ S_n(1)\ S_n(2)\ S_n(3)\ S_n(4)\ S_n(5)\ S_n(6)\ S_n(7)\ S_n(0)\ S_n(1)\ S_n(2)\ S_n(3)]$ As a method of configuring sequences mapped to Multi-RB to have consecutive phases, a mapping relationship may be configured according to RB number as shown in Table 2 below.

TABLE 2

| | 0 1 2 3 4 5 6 7 8 9 10 11 |
|---|---|
| Even (/Odd) number RB | $[S_n(0)\ S_n(1)\ S_n(2)\ S_n(3)\ S_n(4)\ S_n(5)\ S_n(6)\ S_n(7)\ S_n(0)$ $S_n(1)\ S_n(2)\ S_n(3)]$ |
| Odd (/Even) number RB | $[S_n(4)\ S_n(5)\ S_n(6)\ S_n(7)\ S_n(0)\ S_n(1)\ S_n(2)\ S_n(3)\ S_n(4)$ $S_n(5)\ S_n(6)\ S_n(7)]$ |

2. Embodiment 2-2

When the time domain cyclic shift is applied, DFT vector $\exp(j*2*pi*n*k/4)$ with an interval 4 may be used. Accordingly, impulse response with respect to respective radio channels of four layers may advantageously space the layers in the time domain apart from each other by a maximum interval. In particular, the present embodiment may be applied to a pattern using four orthogonal DMRS APs via CDM. In this case, Hadamad-4 may be applied as the orthogonal sequence.

When an orthogonal DMRS antenna port is defined via FDM and CDM, if 12 REs are defined as 1 RB, CDM may be applied in units of 6 REs to distinguish between four DMRS APs and four other DMRS APs may be defined via CDM in other 6 RE resources. In this case, since a vector with a length of 4 is mapped to 6 REs, one cycle and a half cycle of the vector may be mapped similarly to the aforementioned mapping. In this case, similarly, as a method of configuring sequences mapped to Multi-RB to have consecutive phases, a mapping relationship be also be configured according to an RB number, as shown in FIG. 3.

TABLE 3

|  | 0 1 2 3 4 5 6 7 8 9 10 11 |
|---|---|
| Even (/Odd) number RB | $[S_n(0)\text{-}S_n(1)\text{-}S_n(2)\text{-}S_n(3)\text{-}S_n(0)\text{-}S_n(1)\text{-}]$ |
| Odd (/Even) number RB | $[S_n(2)\text{-}S_n(3)\text{-}S_n(0)\text{-}S_n(1)\text{-}S_n(2)\text{-}S_n(3)\text{-}]$ |

<Method of Applying FDM and CDM>

With regard to resource mapping for configuring 12 REs with 1 RB, four APs may be differentiated in six REs and four other APs may be differentiated in six other REs via CDM.

FIG. 28 is a diagram showing a method of applying FDM and CDM according to an embodiment of the present invention.

In detail, (a) of FIG. 25 illustrates a method of grouping two consecutive REs and deploying the groups at an interval of 2 REs. (b) of FIG. 25 illustrates a method of grouping REs with an interval of 2 REs.

Four APs may be differentiated in each of the two groups G1 and G2. In this case, the aforementioned CDM code may be applied to each group.

When multiple user transmission is performed in DL transmission, an eNB may allocate a DMRS port for channel estimation of multiple users in a FDM and CDM group. The eNB may indicate DMRS ports to be used by respective users and may basically determine a DMRS port used by a separate user. When the multiple users are allocated with DMRS APs, if a UE knows DMRS port information used by other users, there is the possibility that channel estimation performance is enhanced.

For example, when the UE is allocated with two DMRS ports and, to this end, if two sequences are selected during CDM, the UE may average the sequences in units of 2 REs to distinguish between two DMRS APs. There is the possibility that the remaining two sequences are allocated to another UE and, thus, the corresponding UE may average the sequences in units of four REs to distinguish between two DMRS APs.

It may be desirable to average REs at as short as possible distance in consideration of frequency selectivity of a radio channel and, in this case, when two REs are averages, excellent channel estimation performance may be expected compared with the case in which four REs are averaged. In multiple user transmission, when a UE is notified about multiple user multiplexing related information or length information of CDM, the UE may adjust an averaging unit during channel estimation. For example, an indicator indicating whether CDM-2 (orthogonal resource with length 2 is used) and CDM-4 (orthogonal resource with length 4 is used) is used to the UE may be considered.

Figure 29:
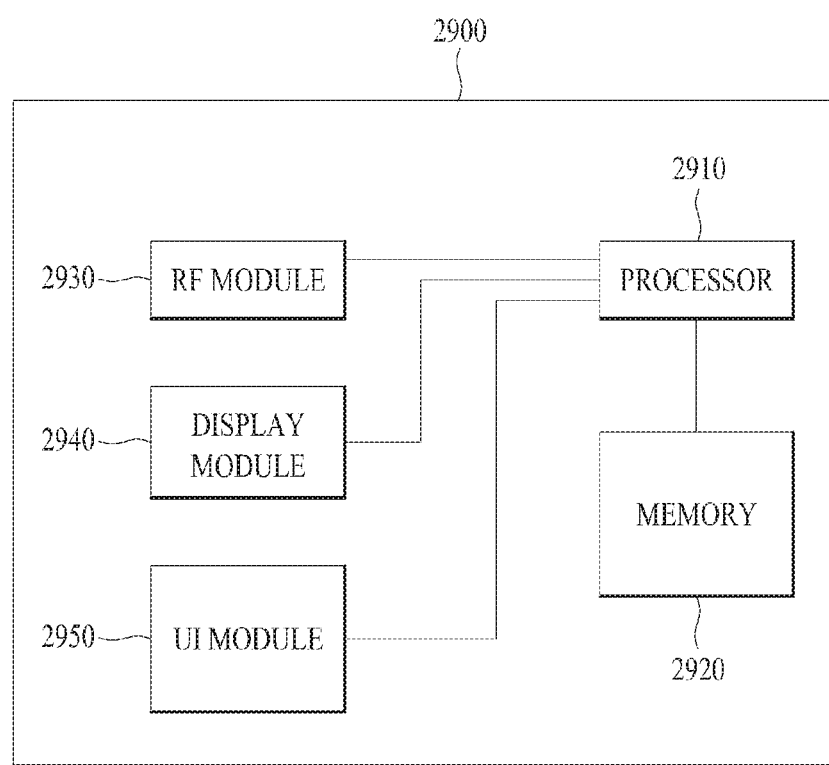
FIG. 29 is a block diagram of a communication apparatus according to an embodiment of the present disclosure.

Referring to FIG. 29, a communication apparatus 2900 includes a processor 2910, a memory 2920, an RF module 2930, a display module 2940, and a User Interface (UI) module 2950.

The communication device 2900 is shown as having the configuration illustrated in FIG. 29, for the convenience of description. Some modules may be added to or omitted from the communication apparatus 2900. In addition, a module of the communication apparatus 2900 may be divided into more modules. The processor 2910 is configured to perform operations according to the embodiments of the present disclosure described before with reference to the drawings. Specifically, for detailed operations of the processor 2610, the descriptions of FIGS. 1 to 28 may be referred to.

The memory 2920 is connected to the processor 2910 and stores an Operating System (OS), applications, program codes, data, etc. The RF module 2930, which is connected to the processor 2910, upconverts a baseband signal to an RF signal or downconverts an RF signal to a baseband signal. For this purpose, the RF module 2930 performs digital-to-analog conversion, amplification, filtering, and frequency upconversion or performs these processes reversely. The display module 2940 is connected to the processor 2910 and displays various types of information. The display module 2940 may be configured as, not limited to, a known component such as a Liquid Crystal Display (LCD), a Light Emitting Diode (LED) display, and an Organic Light Emitting Diode (OLED) display. The UI module 2950 is connected to the processor 2910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for transmitting a reference signal (RS) in a wireless communication system to a 5th generation NewRAT system has been described, the present invention is applicable to various wireless communication systems in addition to the 5$^{th}$ generation NewRAT system.

What is claimed is:

1. A method of operating by a user equipment (UE) in a wireless communication system that includes a base station (BS), the method comprising:
   receiving, by the UE from the BS, information related to a demodulation reference signal (DMRS) resource of an orthogonal frequency division multiplexing (OFDM) symbol,
   wherein the received information informs the UE whether or not a first resource element group of the DMRS resource of the OFDM symbol is to be used for transmitting data to the BS;
   transmitting, by the UE to the BS, a DMRS via a second resource element group of the DMRS resource of the OFDM symbol,
   wherein the first resource element group of the OFDM symbol is different than the second resource element group of the OFDM symbol, and
   wherein, based on the received information, the transmitting the DMRS comprises transmitting data in the first resource element group or not transmitting data in the first resource element group.

2. The method of claim 1, wherein the received information further informs the UE of the second resource element group of the DMRS resource that is to be used for transmitting the DMRS to the BS.

3. The method of claim 1, wherein the received information relates to DMRS transmissions via cyclic prefix-OFDM (CP-OFDM).

4. The method of claim 1, wherein the first and second resource element groups are interlaced within the DMRS resource.

5. A user equipment (UE) for operating in a wireless communication system that includes a base station (BS), the UE comprising:
   a memory;
   a transceiver; and
   a processor operatively connected to the memory and transceiver, the processor for:
      receiving, by the UE from the BS, information related to a demodulation reference signal (DMRS) resource of an orthogonal frequency division multiplexing (OFDM) symbol,
      wherein the received information informs the UE whether or not a first resource element group of the DMRS resource of the OFDM symbol is to be used for transmitting data to the BS;
      transmitting, by the UE to the BS, a DMRS via a second resource element group of the DMRS resource of the OFDM symbol,
      wherein the first resource element group of the OFDM symbol is different than the second resource element group of the OFDM symbol, and
      wherein, based on the received information, the transmitting the DMRS comprises transmitting data in the first resource element group or not transmitting data in the first resource element group.

6. The UE of claim 5, wherein the received information further informs the UE of the second resource element group of the DMRS resource that is to be used for transmitting the DMRS to the BS.

7. The UE of claim 5, wherein the received information relates to DMRS transmissions via cyclic prefix-OFDM (CP-OFDM).

8. The UE of claim 5, wherein the first and second resource element groups are interlaced within the DMRS resource.

9. A method of operating by a base station (BS) in a wireless communication system that includes a user equipment (UE), the method comprising:
   transmitting, by the BS to the UE, information related to a demodulation reference signal (DMRS) resource of an orthogonal frequency division multiplexing (OFDM) symbol,
   wherein the transmitted information informs the UE whether or not a first resource element group of the DMRS resource of the OFDM symbol is to be used for transmitting data to the BS;
   receiving, by the BS from the UE, a DMRS via a second resource element group of the DMRS resource of the OFDM symbol,
   wherein the first resource element group of the OFDM symbol is different than the second resource element group of the OFDM symbol, and
   wherein, based on the transmitted information, the receiving the DMRS comprises receiving data in the first resource element group or not receiving data in the first resource element group.

10. The method of claim 9, wherein the transmitted information further informs the UE of the second resource element group of the DMRS resource that is to be used for transmitting the DMRS to the BS.

11. The method of claim 9, wherein the transmitted information relates to DMRS transmissions via cyclic prefix-OFDM (CP-OFDM).

12. The method of claim 9, wherein the first and second resource element groups are interlaced within the DMRS resource.

13. A base station (BS) for operating in a wireless communication system that includes a user equipment (UE), the BS comprising:
   a memory;
   a transceiver; and
   a processor operatively connected to the memory and transceiver, the processor for:
      transmitting, by the BS to the UE, information related to a demodulation reference signal (DMRS) resource of an orthogonal frequency division multiplexing (OFDM) symbol,
      wherein the transmitted information informs the UE whether or not a first resource element group of the DMRS resource of the OFDM symbol is to be used for transmitting data to the BS;

receiving, by the BS from the UE, a DMRS via a second resource element group of the DMRS resource of the OFDM symbol, wherein the first resource element group of the OFDM symbol is different than the second resource element group of the OFDM symbol, and wherein, based on the transmitted information, the receiving the DMRS comprises receiving data in the first resource element group or not receiving data in the first resource element group.

14. The BS of claim 13, wherein the transmitted information further informs the UE of the second resource element group of the DMRS resource that is to be used for transmitting the DMRS to the BS.

15. The BS of claim 13, wherein the transmitted information relates to DMRS transmissions via cyclic prefix-OFDM (CP-OFDM).

16. The BS of claim 13, wherein the first and second resource element groups are interlaced within the DMRS resource.

* * * * *